(12) United States Patent
Fei et al.

(10) Patent No.: US 10,147,941 B2
(45) Date of Patent: Dec. 4, 2018

(54) SYNTHESIS METHOD FOR CATHODE MATERIAL IN LITHIUM-SULFUR BATTERY

(71) Applicant: The Hong Kong Polytechnic University, Hong Kong (CN)

(72) Inventors: Linfeng Fei, Hong Kong (CN); Yu Wang, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 249 days.

(21) Appl. No.: 15/070,058

(22) Filed: Mar. 15, 2016

(65) Prior Publication Data

US 2017/0271660 A1     Sep. 21, 2017

(51) Int. Cl.
| | |
|---|---|
| *H01M 4/38* | (2006.01) |
| *H01M 4/62* | (2006.01) |
| *H01M 10/0525* | (2010.01) |
| *H01M 4/36* | (2006.01) |
| *H01M 4/587* | (2010.01) |
| *C01B 32/192* | (2017.01) |

(52) U.S. Cl.
CPC ............. *H01M 4/38* (2013.01); *C01B 32/192* (2017.08); *H01M 4/364* (2013.01); *H01M 4/382* (2013.01); *H01M 4/587* (2013.01); *H01M 10/0525* (2013.01)

(58) Field of Classification Search
CPC ........ H01M 4/38; H01M 4/382; H01M 4/364; H01M 4/587; H01M 10/0525; C01B 32/192
See application file for complete search history.

(56) References Cited

U.S. PATENT DOCUMENTS

| 8,753,772 | B2 | 6/2014 | Liu et al. | |
|---|---|---|---|---|
| 8,999,574 | B2 | 4/2015 | Liu et al. | |
| 9,023,528 | B2 | 5/2015 | Liang et al. | |
| 2013/0171339 | A1* | 7/2013 | Wang | H01M 4/38 |
| | | | | 427/113 |
| 2015/0010825 | A1* | 1/2015 | Yang | H01B 1/04 |
| | | | | 429/231.8 |
| 2017/0294646 | A1* | 10/2017 | Zhang | H01M 4/364 |

OTHER PUBLICATIONS

Fei et al., 2015, "Graphene/Sulfur Hybrid Nanosheets from a Space-Confined "Sauna" Reaction for High-Performance Lithium-Sulfur Batteries", Advanced Materials, 27:5936-5942.

* cited by examiner

*Primary Examiner* — Muhammad S Siddiquee
(74) *Attorney, Agent, or Firm* — Law Office of Albert Wai-Kit Chan, PLLC

(57) ABSTRACT

The present invention relates to a method for synthesizing graphene/sulfur composite, involving the steps of mixing graphene oxide (GO) with a hydrogen sulfide ($H_2S$)-releasing agent in a sealed vessel, causing the $H_2S$-releasing agent to release hydrogen sulfide, and then allowing the hydrogen sulfide to react with the graphene oxide at an elevated temperature and pressure to form said graphene/sulfur composite.

16 Claims, 31 Drawing Sheets

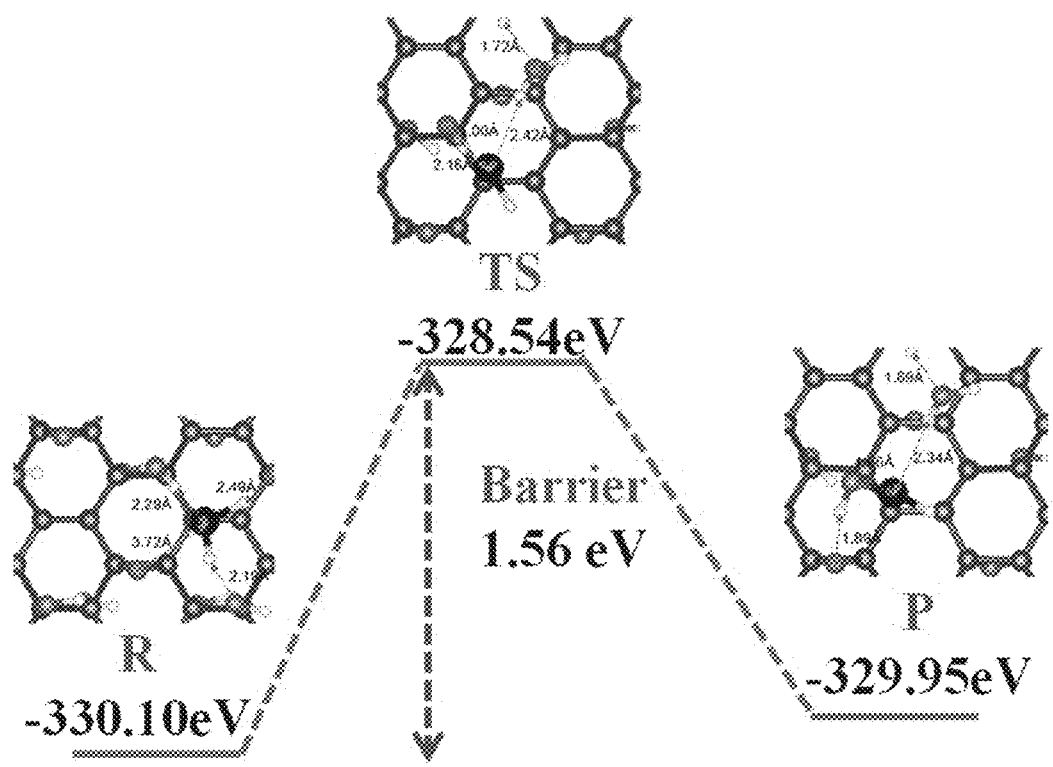

SYNTHESIS METHOD FOR CATHODE MATERIAL IN LITHIUM-SULFUR BATTERY

FIELD OF THE INVENTION

This invention relates to a space-confined "sauna" reaction system for the synthesis of graphene-based composites.

BACKGROUND OF THE INVENTION

The state-of-the-art Li-ion battery technology is facing formidable challenges, because of the increasing demands for high capacity and large-current application scenarios [1]. For example, to supply power to electrical vehicles that last 300-500 miles with a single charge. In this context, scientists have switched their attention to lithium-sulfur battery because of its high theoretical energy density of up to 2600 W h kg$^{-1}$ (corresponding to a specific capacity of 1675 mA h g$^{-1}$ for sulfur cathode), five times higher than that of lithium-ion batteries based on conventional cathodes [2-7]. However, the commercialization of lithium-sulfur battery remains hampered by two major obstacles: (i) the intrinsic poor electronic conductivity of sulfur ($5 \times 10^{-30}$ S cm$^{-1}$) and its discharging products ($Li_2S$ and $Li_2S_2$), making the overall utilization of sulfur electrode very low and limiting such batteries' rate performances, and (ii) the high solubility of the polysulfides formed upon repeated charge/discharge cycles; such polysulfides can shuttle from cathode to anode, where they deposit in the form of solid $Li_2S/Li_2S_2$, leading to the continuous consumption of cathode material, and resulting in severe cycle life degradation [8-10].

One possible way to improve the conductivity of sulfur electrode and to alleviate the shuttle effect mentioned above would be to construct a composite [11, 12], and in view of this, a number of composites have been fabricated including carbon-sulfur composites [5, 13-16], polymer-sulfur composites [17-22], metal oxide-sulfur composites [23], etc. Among the many candidate matrixes, graphene, a 2D and one atom-thick carbon layer, has been tailored to host sulfur in battery applications [24-35], for its superior electrical conductivity, excellent mechanical flexibility, and high theoretical surface area. So far, most studies have adopted two methods to prepare graphene/sulfur (G/S) composites: i) thermal infusion strategy (using liquid-solid interaction in which graphene is soaked in melted sulfur) [26, 27, 32, 35], and ii) the solution-based synthesis (using the reaction of either sodium thiosulfate or sodium polysulfide with acid to precipitate sulfur in graphene suspension) [24, 25, 29, 31, 33, 34]. However, as a typical "2D" material, graphene itself cannot effectively confine sulfur (and polysulfides) inside the composite due to its intrinsic geometrical characteristics [33, 36].

Strong chemical bonding between graphene and sulfur (and its discharging products) is essential for improving the electrochemical performance of lithium-sulfur batteries [37-40]. And the proper engineering of interfacial chemistry between graphene and sulfur should revive G/S composite for future applications.

SUMMARY OF THE INVENTION

The present invention provides a space-confined "sauna" system to realize the redox reaction between GO (graphene oxide) and $H_2S$ so as to harvest G/S hybrid nanosheets (FIG. 1A and FIG. 1B). This novel approach has the merits of high sulfur loading, tight contact on GIS interface, complete $H_2S$ utilization, and high scalability for commercialization.

The present invention relates to a method for synthesizing graphene/sulfur composite, comprising the steps of (a) mixing graphene oxide (GO) with a hydrogen sulfide ($H_2S$)-releasing agent in a sealed vessel; (b) causing said $H_2S$-releasing agent to release hydrogen sulfide; and (c) allowing the hydrogen sulfide to react with the graphene oxide at an elevated temperature and pressure to form said graphene/sulfur composite.

DEFINITIONS & ABBREVIATIONS

The following terms are used to describe the present invention. In the absence of a specific definition set forth herein, the terms used to describe the present invention shall be given their common meaning as understood by those of ordinary skill in the art.

As used herein, the expression "C" refers to carbon or Columbic.

As used herein, the expression "CV" refers to Cyclic Voltammetry.

As used herein, the expression "EDS" refers to Energy Dispersive Spectrum.

As used herein, the expression "EELS" refers to Electron Energy-Loss Spectrum.

As used herein, the expression "FTIR" refers to Fourier Transform Infrared.

As used herein, the expression "GO" refers to Graphene Oxide.

As used herein, the expression "G/S" refers to Graphene-Sulfur hybrid.

As used herein, the expression "HAADF" refers to High Angle Annular Dark Field.

As used herein, the expression "pGO" refers to perfect Graphene Oxide.

As used herein, the expression. "S" refers to Sulfur.

As used herein, the expression "SAED" refers to Selected Area Electron Diffraction.

As used herein, the expression "SEM" refers to Scanning Electron Microscopy.

As used herein, the expression "TAA" refers to Thioacetamide.

As used herein, the expression "TEM" refers to Transmission Electron Microscopy.

As used herein, the expression "TGA" refers to Thermal Gravimetric Analysis.

As used herein, the expression "XPS" refers to X-Ray Photoelectron Spectroscopy.

As used herein, the expression "XRD" refers to X-Ray Diffraction.

BRIEF DESCRIPTION OF THE DRAWINGS

FIG. 5A shows a cyclic voltammetry (CV) measured in a potential window from 1.5 to 3.0 V at a scan rate of 0.1 MV $s^{-1}$ for the first, second, and third cycles. FIG. 5B shows the first galvanostatic charge-discharge curves of the G/S cathode at 0.2 C (1 C=1675 mA $g^{-1}$). FIG. 5C shows discharge capacities at different current densities from 0.2 to 5 C of the G/S cathode, in comparison with pure S cathode. FIG. 5D shows cyclic performance and Coulombic efficiency of the G/S cathode at 0.5 C, in comparison with pure S cathode.

FIGS. 11A-11H show the possible reaction mechanism between GO and $H_2S$ from Example 2 (R=reactant, TS=transition state, M =intermediate product, and P=product). FIG. 11A shows a supercell of pGO used for the calculation of the possible reaction mechanism. FIG. 11B shows a supercell of graphene oxide with defect of removing two hydroxyl —OH from the ortho-position. FIG. 11C shows a supercell of graphene with single epoxy group —O—. FIG. 11D shows a supercell of graphene with two hydroxyl —OH at the ortho-position (noted with dashed line). FIG. 11E shows a possible reaction mechanism of self-decomposition of GO at 2-OH →—O—+$H_2O$ on pGO. FIG. 11F shows a possible reaction mechanism of $H_2S+2$—OH→HS—OH+$H_2O$ on pGO. FIG. 11G shows a possible reaction mechanism of GO with defect of two hydroxyls —OH at the ortho-position, including the reaction steps of (i) $H_2S+$—O—→—SH+—OH, (ii) —SH+—OH→—S—+$H_2O$. FIG. 11H shows a possible reaction mechanism of $H_2S+$—OH→—SH+$H_2O$.

FIG. 14A shows the TEM image of G/S hybrid nanosheets after 70 cycles, wherein the discharged products and lithium salts are visible as irregular particles. FIG. 14B shows a magnified high-resolution TEM image of FIG. 14A showing the graphene edges. FIG. 14C shows the HAADF image of the G/S hybrid nanosheets after 70 cycles. FIG. 14D shows the carbon elemental mapping from the rectangle region of the HAADF image in FIG. 14C. FIG. 14E shows the sulfur elemental mapping from the rectangle region of the HAADF image in FIG. 14C.

DETAILED DESCRIPTION OF THE INVENTION

The lithium-sulfur batteries are promising because of the high energy density, low cost, and natural abundance of sulfur material. Although great improvement in the cycling performances of lithium-sulfur batteries has been made, all these achievements are obtained in exchange for the energy density and process cost. Furthermore, syntheses of nanostructured sulfur composites based on various types of carbon materials and conducting polymers are very costly and the cathodes using these composites contain low sulfur content (<60%) and low sulfur-loading (<2 mg/cm$^2$), which dramatically reduces the energy density of lithium-sulfur batteries.

In the present invention, a novel, effective and low-cost synthesis method for the production of graphene/sulfur composite is disclosed. The cheap raw materials and simple experimental setup without high-pressure device throughout the synthesis result in cheap and facile mass production process of graphene/sulfur composite.

The present invention uses graphene oxide (GO) to facilitate the subsequent S anchoring due to the ample functional groups on its surfaces [41, 42]. In this invention, a space-confined "sauna" reaction system is provided for the simultaneous reduction and functionalization of graphene oxide to produce unique graphene-sulfur (G/S) hybrid nanosheets, which can be directly used as the cathode material in lithium-sulfur batteries with excellent electrochemical performance.

GO can be synthesized in advance by oxidation of graphite flakes via a modified Hummers' method [43], followed by a freeze-drying process to reserve its porosity.

The present invention requires a novel reducing agent, hydrogen sulfide ($H_2S$), to efficiently reduce GO toward high-quality graphene. Since $H_2S$ is a major and toxic air pollutant, the system of the present invention also offers an alternative method to eliminate and reuse $H_2S$ for a greener future.

In one embodiment, the H$_2$S source is in the form of thioacetamide (CH$_3$C(S)NH$_2$) as it can release H$_2$S via simple hydrolysis (CH$_3$C(S)NH$_2$+H$_2$O→CH$_3$C(O)NH$_2$+H$_2$S).

Figure 1A:
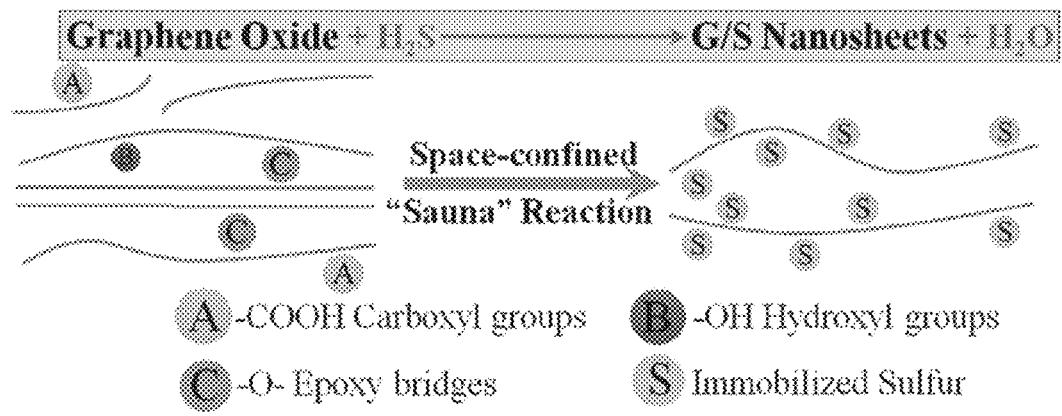
FIG. 1A is a schematic illustration of the space-confined synthesis of G/S hybrid nanosheets.
Figure 1B:
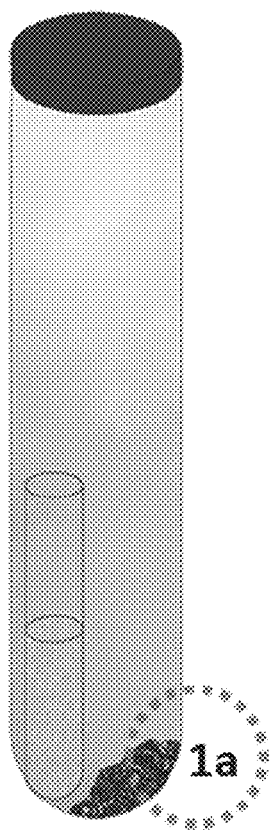
FIG. 1B is a schematic illustration of the "sauna" reaction system.
Figure 1C:
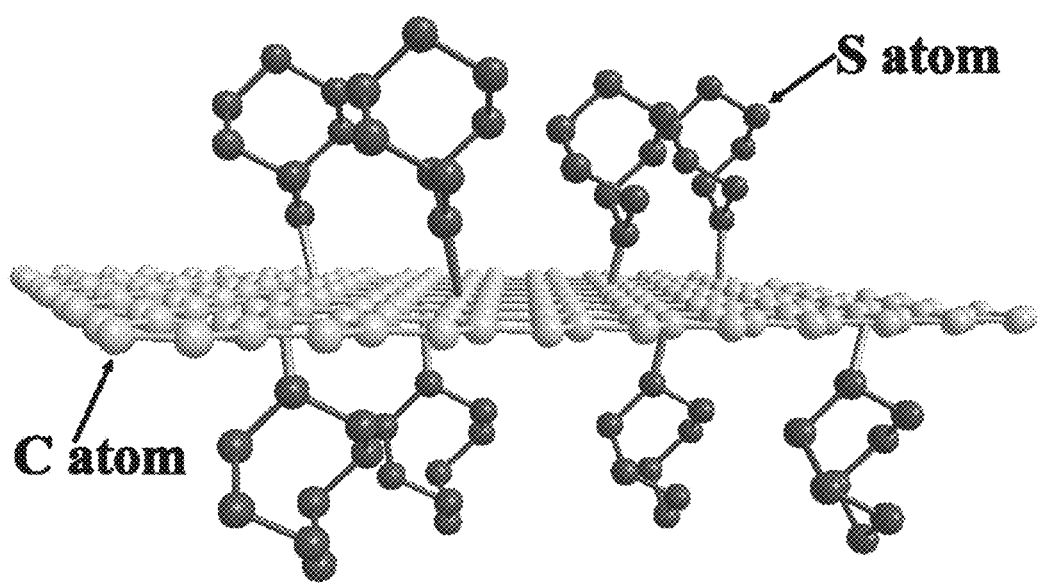
FIG. 1C is a sketch of the interfacial bonding in the G/S hybrid nanosheets between graphene and sulfur.

The present invention provides a space-confined "sauna" system to realize the redox reaction between GO and H$_2$S so as to harvest G/S hybrid nanosheets. In general, GO and an H$_2$S-releasing source are mechanically mixed inside a sealed vessel containing a tube filled with water (FIG. 1B). The sealed vessel is then heated to 60-300° C. and maintained at this temperature for 5-30 h. Subsequently, the H$_2$S produced from hydrolysis of the H$_2$S-releasing source in water vapor would react with GO in situ to form the G/S hybrid nanosheets. Furthermore, the oxidation-reduction reaction between GO and H$_2$S produces graphene and S (GO+H$_2$S→G/S+H$_2$O), resulting in chemically bonded (rather than via a weak "physical" contact) G/S interfaces (FIG. 1A and FIG. 1C). This novel approach has the merits of high sulfur loading, tight contact on G/S interface, complete H$_2$S utilization, and high scalability for commercialization.

In one embodiment, GO and thioacetamide are mechanically mixed inside a sealed Teflon vessel containing a glass tube filled with water (FIG. 1B). The vessel is then heated to 200° C. and maintained at this temperature for 20 h. Subsequently, the H$_2$S produced from hydrolysis of TAA in water vapor would react with GO in situ to form the G/S hybrid nanosheets (FIG. 1A). The S loading amount in the composite can be as high as 68%.

In one embodiment, this invention provides a method for synthesizing graphene/sulfur composite comprising the steps of (a) mixing graphene oxide (GO) with a hydrogen sulfide (H$_2$S)-releasing agent in a sealed vessel; (b) causing said H$_2$S-releasing agent to release hydrogen sulfide; and (c) allowing the hydrogen sulfide to react with the graphene oxide at an elevated temperature and pressure to form said graphene/sulfur composite. In another embodiment, the graphene oxide is prepared from graphite flake using a chemical oxidation method selected from the Hummers method, Staudenmeier method, Hofmann method, and Brodie method. In yet another embodiment, the H$_2$S-releasing agent is selected from thioacetamide, thiourea, dimethylthiourea, thiosulfate, and any combination thereof. In one embodiment, the weight ratio of GO to H$_2$S-releasing agent is in a range of 1:1-1:100. In a further embodiment, the method is carried out under an atmosphere of inert gas selected from nitrogen, helium, argon, neon, xenon, krypton, and radon. In one embodiment, the elevated temperature is 60-300° C. In another embodiment, step (c) is performed over a period of 5-30 h. In one embodiment, the H$_2$S-releasing agent is hydrolyzed with water in the vessel to release H$_2$S.

In one embodiment, the graphene/sulfur composite is prepared by a method comprising the steps of (a) mixing graphene oxide (GO) with a hydrogen sulfide (H$_2$S)-releasing agent in a sealed vessel; (b) causing said H$_2$S-releasing agent to release hydrogen sulfide; and (c) allowing the hydrogen sulfide to react with the graphene oxide at an elevated temperature and pressure to form said graphene/sulfur composite, wherein the sulfur is homogeneously distributed on graphene with a strong chemical bonding interface. In another embodiment, the sulfur loading of the composite ranges from 5% to 80%. In one embodiment, the graphene-sulfur composite has a sandwiched structure of sulfur/graphene/sulfur. In another embodiment, the graphene/sulfur composite has an ultrahigh electronic conductivity of at least 9.5 S/cm$^{-1}$. In yet another embodiment, the graphene/sulfur composite can be directly used as a cathode material in a rechargeable lithium-sulfur battery. In an embodiment, the diffusion of sulfur into electrolyte during charge/discharge cycles is significantly suppressed due to the strong chemical bonding between sulfur and graphene. In one embodiment, a cathode made from said graphene/sulfur composite has an initial charging capacity of at least 1200 mA h/g at 0.2 C. In another embodiment, a cathode made from said graphene/sulfur composite has a high discharging capacity of at least 700 mA h/g at 2 C. in a further embodiment, a cathode made from said graphene/sulfur composite has a retention rate of at least 67% after 70 cycles.

In addition, thin layers of amorphous sulfur are tightly anchored on the graphene sheet via strong chemical bonding in the as-synthesized graphene/sulfur composite, leading to better performance. The intrinsic low conductivity of sulfur cathode is significantly improved by constructing rational graphene/sulfur hybrid structure. The long-existing "shuttle effect" in lithium-sulfur battery is largely suppressed by confining sulfur during battery cycling via the graphene/sulfur interfacial bonding. As a result, the as-synthesized graphene/sulfur composite delivers better electrochemical performances, in comparison with previous graphene/sulfur structures.

Through the simple simultaneous reduction-functionalization process, compact sulfur/graphene/sulfur sandwiched nanosheets with ultrahigh electronic conductivity can be obtained. Upon using the G/S hybrid nanosheets as cathode material in lithium-sulfur battery, the as-synthesized G/S hybrid nanosheets demonstrated considerably improved electrochemical performance and cycling stability compared with those of conventional graphene/sulfur composite. Therefore, the unique G/S composite has the potential to promote the practical applications of lithium-sulfur battery, whereas the as-developed space-confined reaction pathway is seeing its applicability in synthesizing other graphene-based advanced composites.

The invention will be better understood by reference to the Experimental Details which follow, but those skilled in the art will readily appreciate that the specific experiments are provided only for illustrative purpose, and are not meant to limit the invention scope as described herein, which is defined by the claims following thereafter.

Throughout this application, various references or publications are cited. Disclosures of these references or publications in their entireties are hereby incorporated by reference into this application in order to more fully describe the state of the art to which this invention pertains. It is to be noted that the transitional term "comprising", which is synonymous with "including", "containing" or "characterized by", is inclusive or open-ended, and does not exclude additional, un-recited elements or method steps.

EXAMPLE 1

Synthesis of GO

GO was prepared from natural graphite flakes by a modified. Hummers' method as reported elsewhere [43]. The as-synthesized GO suspension was freeze-dried to obtain GO powder with high porosity.

EXAMPLE 2

Synthesis of G/S Nanosheets

This example illustrates the preparation of G/S hybrid nanosheets.

The G/S hybrid nanosheets were synthesized from a novel "sauna" system (see FIG. 1B). A homogeneously mixed powder of GO and TAA (weight ratio of 1:20) was placed in a Teflon vessel (36 cc in volume) together with a glass tube filled with deionized water (1 cc). The vessel was sealed inside an argon-filled glove box and then heated to 200° C. for 20 h, wherein the heating rate was 1° C. min$^{-1}$. The product was collected from the vessel after it was furnace-cooled to room temperature. After being washed with distilled water and absolute ethanol in turns, the G/S hybrid nanosheets were obtained after being vacuum-dried at 50° C. for 24 h.

EXAMPLE 3

Materials Characterization (1) Thermal Gravimetric (TGA) Measurement

Procedure: TGA was conducted on a Perkin-Elmer Diamond TG/DTA (thermogravimetry/differential thermal analysis) thermal analyzer.

Figure 6:
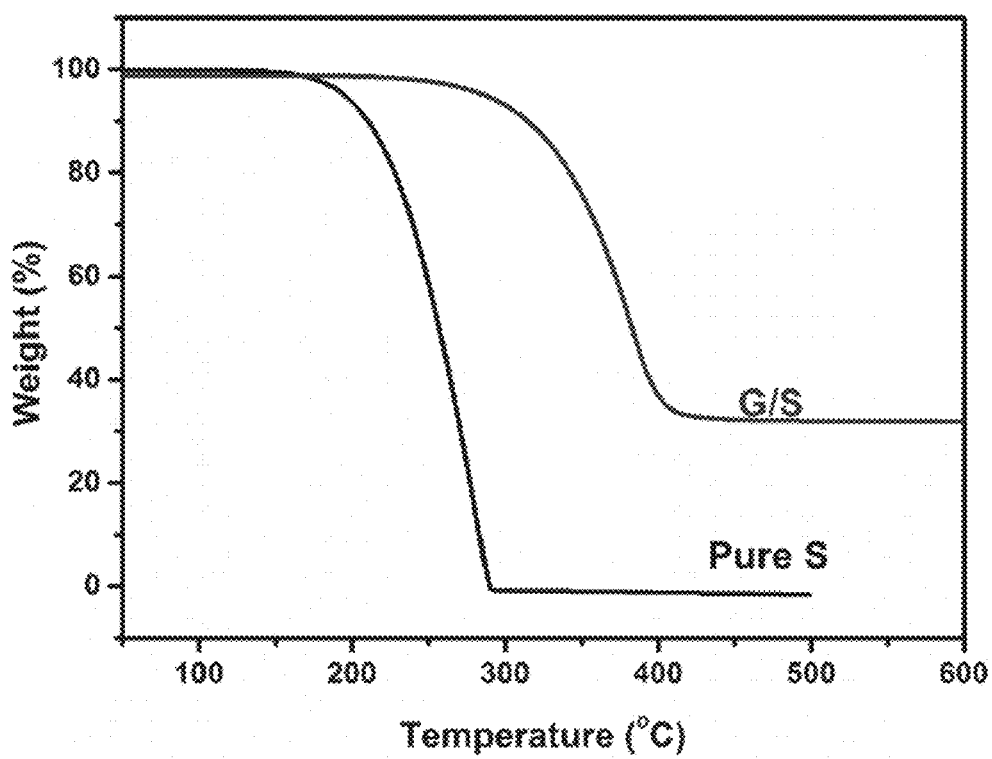
FIG. 6 shows the thermogravimetric curves of the prepared G/S hybrid nanosheets and pure sulfur powder in $N_2$, indicating a sulfur content of 68% in G/S material.

Results: The S loading amount in the composite obtained from Example 2 was as high as 68% based on the thermal gravimetric (TGA) measurement in a nitrogen environment (FIG. 6), among the highest of reported graphene/sulfur composites. TGA results in FIG. 6 also suggest that the sulfur in G/S hybrid nanosheets is more thermally stable than when it is in its pure state, implying enhanced affinity and interaction between sulfur and graphene in the prepared composite (FIG. 1C).

(2) Transmission Electron Microscopy (TEM) and Scanning Electron Microscopy (SEM) Experiments Procedure: SEM observations were made on a JEOL JSM-6700F field-emission SEM. TEM images, SAED patterns, EELS, EDS, HAADF images, and elemental maps were obtained on a JEOL JEM-2100F scanning transmission electron microscopy (200 kV, field-emission gun) equipped with Oxford INCA x-sight EDS and ENFINA 1000 EELS.

Figure 7:
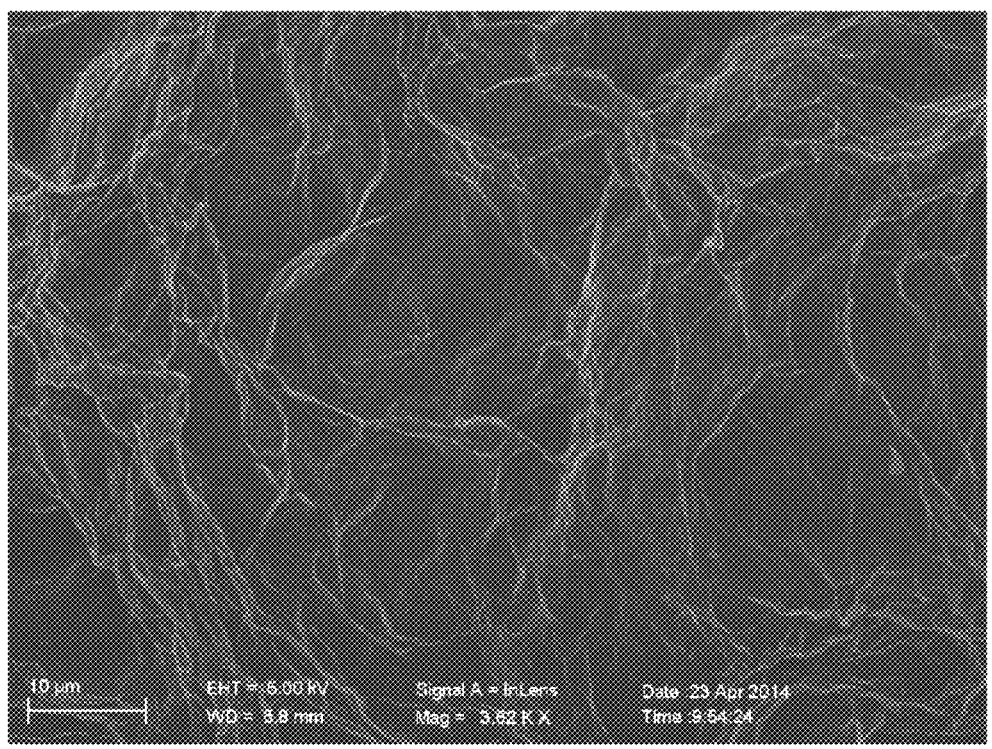
FIG. 7 shows a SEM image of the freeze-dried GO, showing typical layer-like extremely conjugated nanostructures with highly developed porous structures.
Figure 8:
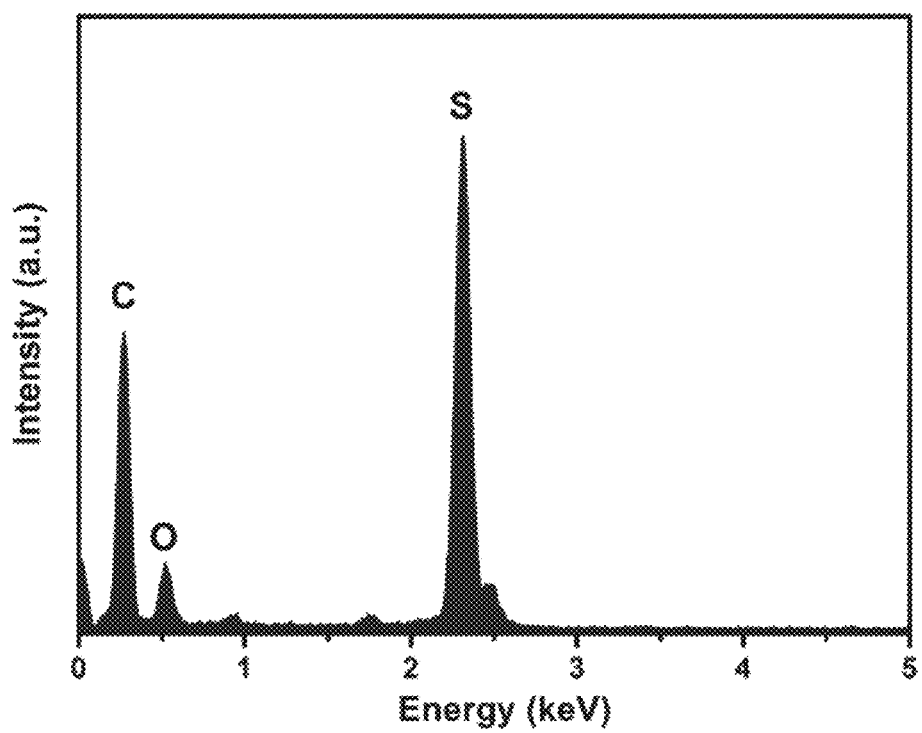
FIG. 8 shows an EDS spectrum of the G/S hybrid nanosheets, showing a C:S weight ratio of 3:7.

Results: Transmission electron microscopy (TEM) and scanning electron microscopy (SEM) experiments were performed to analyze the microstructures of the G/S hybrid nanosheets (FIGS. 2A-2G). As can be seen, the TEM image of GO (FIG. 2A) confirms the formation of microscale flakes, which are loosely stacked due to the freeze-drying process (see also FIG. 7, the SEM image of the GO sample). The associated selected area electron diffraction (SAED) pattern (inset in FIG. 2A) is dominated by diffraction rings, occurring upon the nearly amorphous nature of GO due to severe distortions from sp$^3$ C—O bonds [42]. In contrast, the SEM image, the TEM image, the corresponding energy dispersive spectrum (FIG. 8), and the electron energy-loss spectrum (EELS, FIGS. 2 B-2D) from G/S nanosheets all reveal a uniform layer of S is homogeneously anchored on the surface of graphene sheets (i.e., sulfur/graphene/sulfur sandwich) without any obviously aggregated S particles. The corresponding elemental mapping of C and S from the highangle annular dark field (HAADF) image (FIG. 2F and FIG. 2G) displays simultaneous fluctuations in intensity across the entire scanning area, further confirming the even coating of S on graphene surface. Meanwhile, the SAED pattern from a single G/S nanosheet (inset of FIG. 2C) shows a typical sixfold symmetry expected for graphene without any signs of crystallized S, confirming its amorphous nature.

(3) X-Ray Diffraction (XRD) Measurement

Procedure: XRD was performed on a Philips X'Pert Pro Super diffractometer with Cu K$_\alpha$ radiation ($\lambda$=1.54178 Å).

Figure 2A:
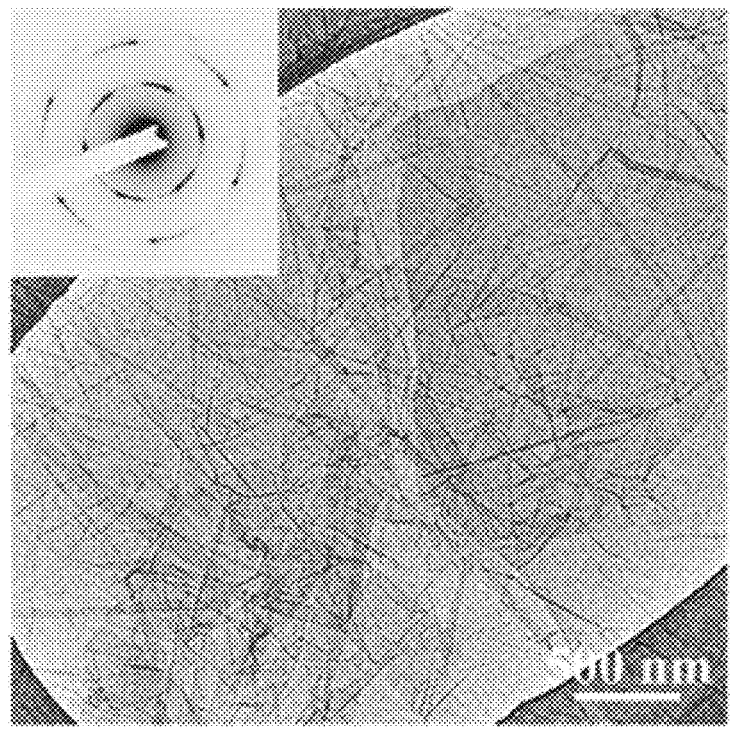
FIG. 2A shows a TEM image of pristine GO, where the inset is selected area electron diffraction pattern (SAED).
Figure 2B:
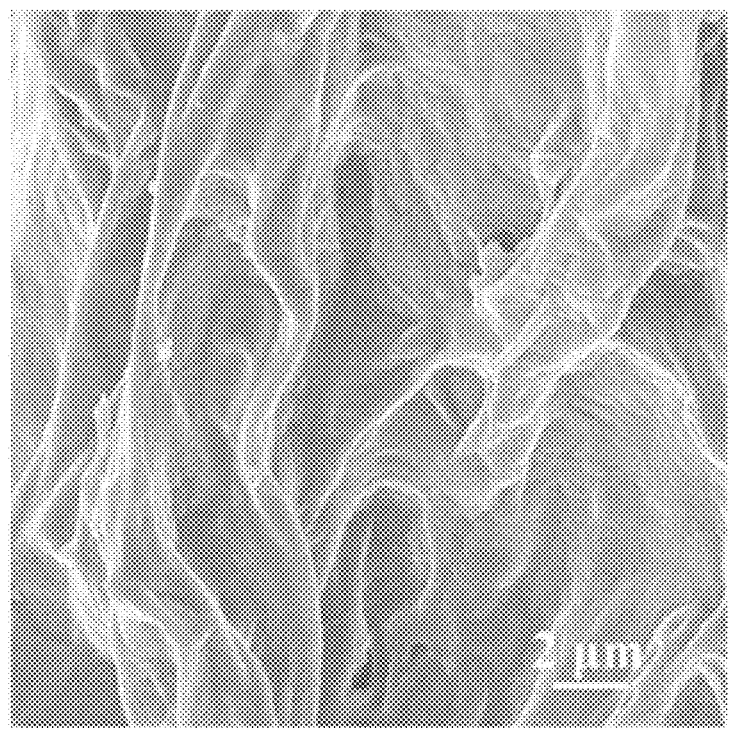
FIG. 2B shows a SEM image of G/S nanosheets.
Figure 2C:
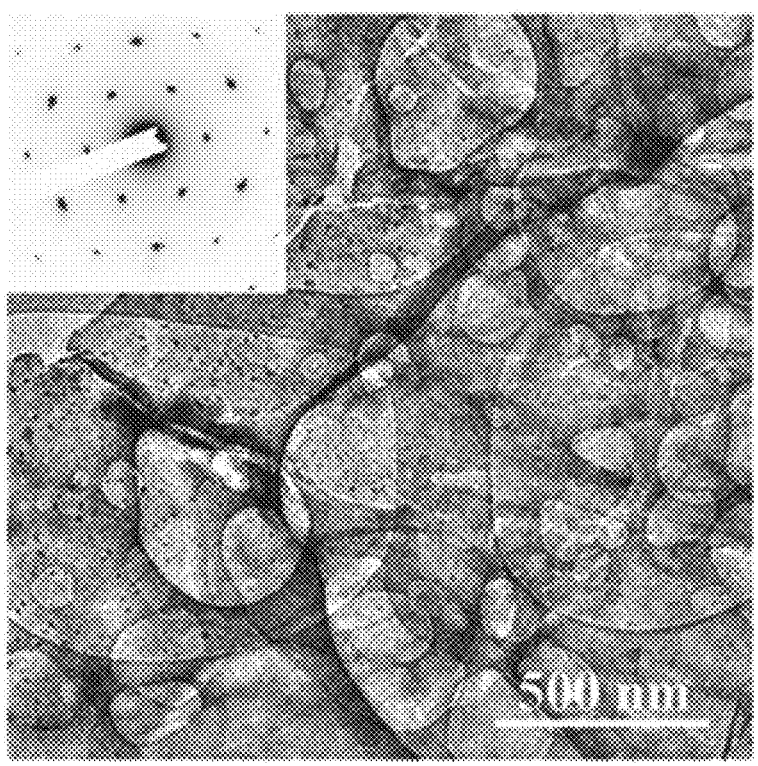
FIG. 2C shows a TEM image of G/S nanosheets, where the inset is selected area electron diffraction pattern (SAED).
Figure 2D:
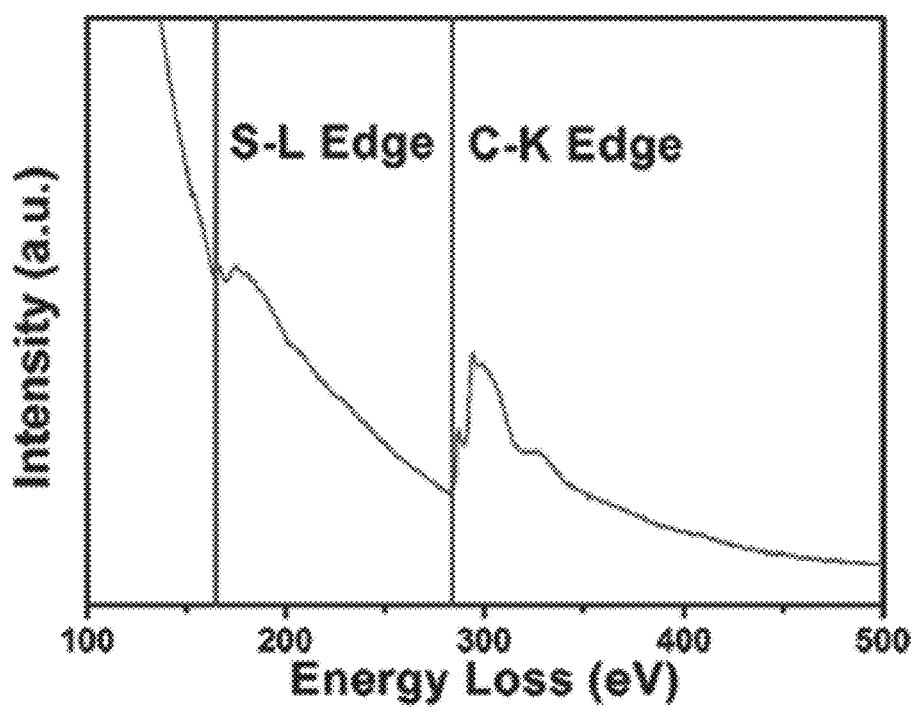
FIG. 2D is the EELS spectrum of the G/S nanosheets.
Figure 2E:
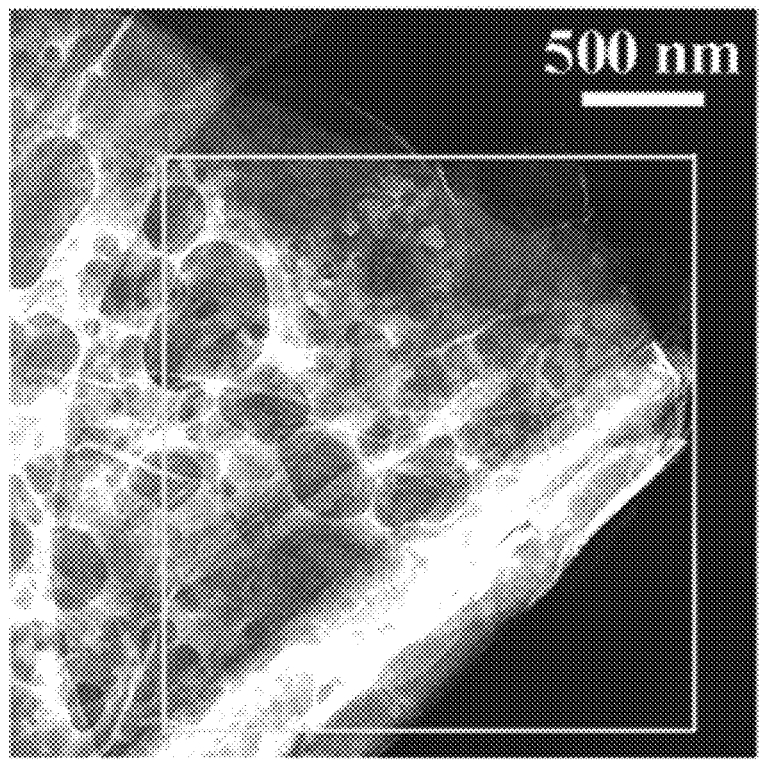
FIG. 2E shows a HAADF image of the G/S nanosheets.
Figure 2F:
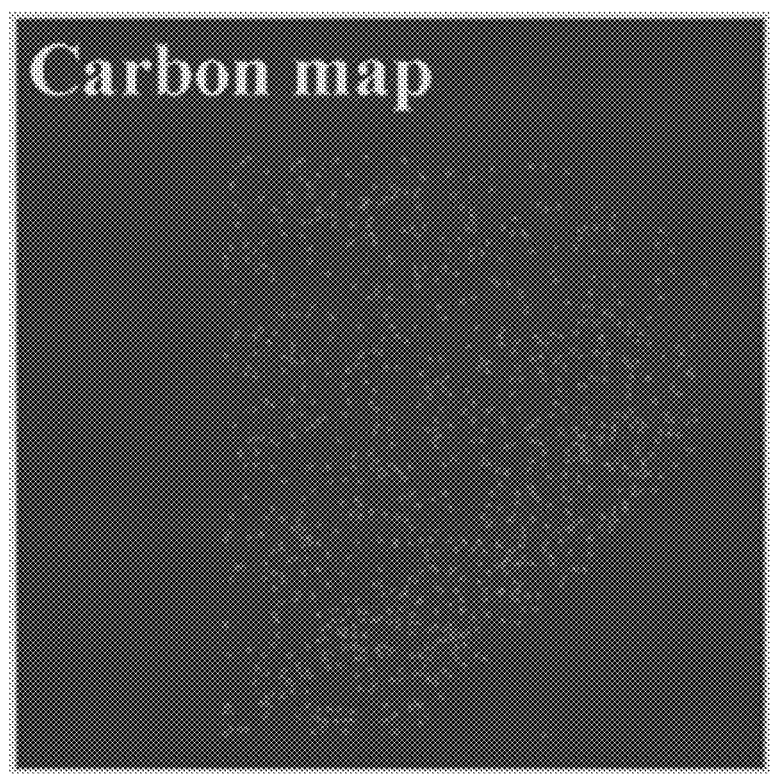
FIG. 2F is the carbon elemental mapping from the HAADF image in FIG. 2E.
Figure 2G:
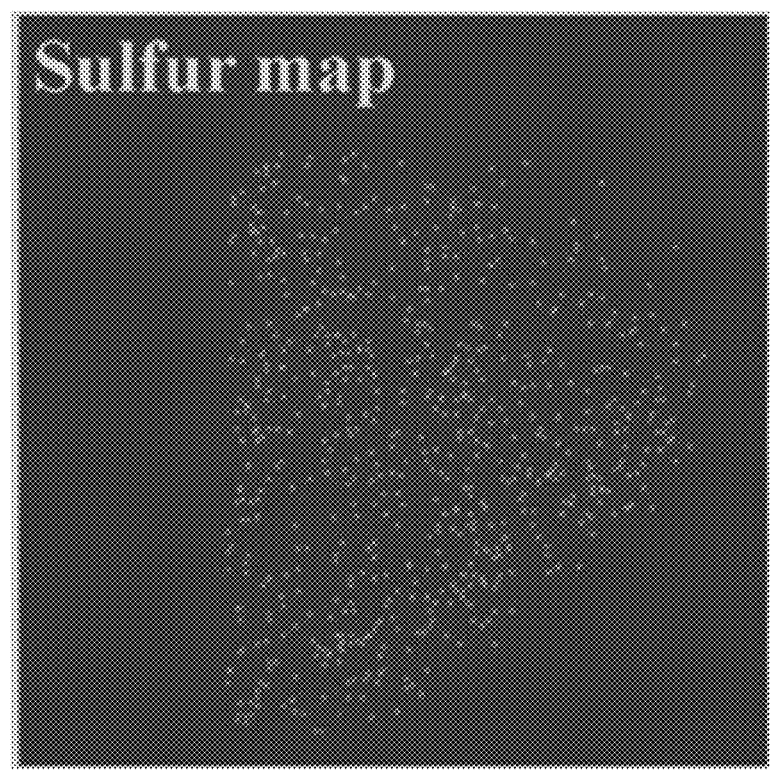
FIG. 2G is the sulfur elemental mapping from the HAADF image in FIG. 2E, showing the uniform distribution of sulfur content on graphene sheet.
Figure 2H:
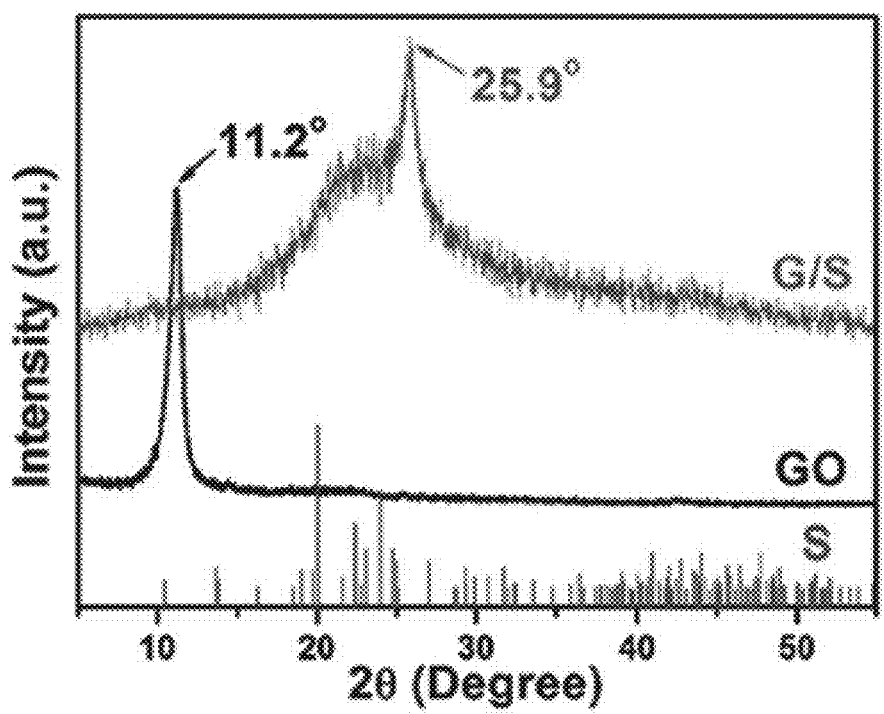
FIG. 2H shows the XRD patterns of GO and G/S nanosheets.

Results: To verify the structural characteristics of the G/S nanosheets, X-ray diffraction (XRD) measurement was conducted on GO and G/S nanosheets, respectively. As shown in FIG. 2H, the pristine GO reflects a single diffraction peak at 11.2° (which corresponds to a d-spacing of 0.80 nm due to the existence of oxygen-containing groups), while the G/S hybrid nanosheets exhibit a broad peak centered at 25.9° (0.34 nm, which corresponds to (0002) spacing of few-layer graphene). As expected, the XRD result verifies the reduction of GO toward high-quality graphene during the "sauna" reaction. No crystalline sulfur peak was detected from the XRD pattern due to its highly dispersed amorphous state, which is in line with the above microstructural observations. It should be noted that, in the literature, solution-based synthesis of sulfur often produces large crystalline S particles (up to several micrometers in diameter) [24, 25, 34], leading to low utilization of active materials and poor rate performance in batteries and therefore it is now generally acknowledged that amorphous sulfur should give rise to high utilization of sulfur in electrochemical lithiations.

(4) X-ray Photoelectron Spectroscopy (XPS)

Procedure: XPS was acquired on an ESCALAB MK II with Mg K$_\alpha$ as the excitation source.

Figure 3A:
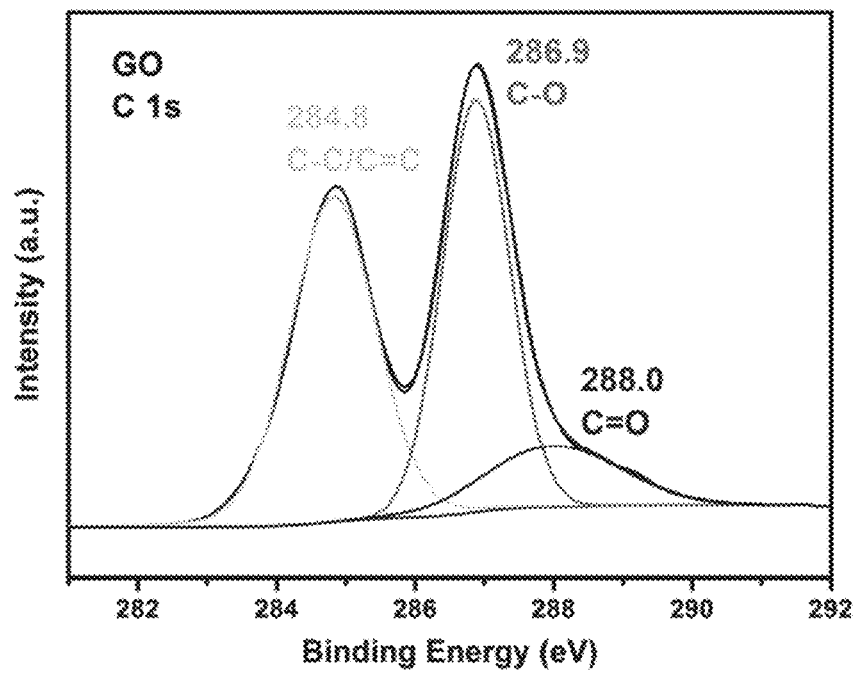
FIG. 3A shows a high-resolution C 1s XPS spectrum of GO hybrid nanosheet, fitted with Gaussian-Lorentzian waveforms.
Figure 3B:
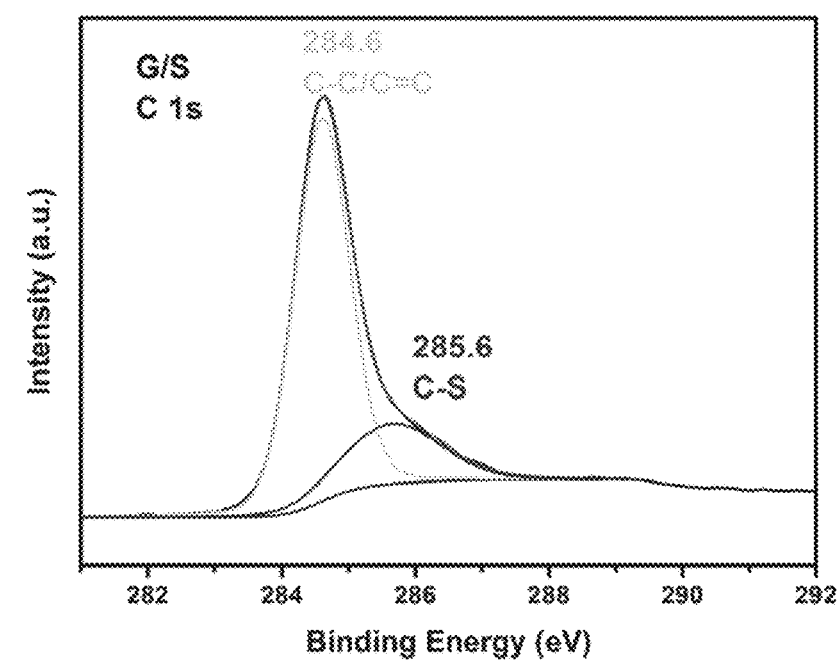
FIG. 3B shows a high-resolution C 1s XPS spectrum of G/S hybrid nanosheet, fitted with Gaussian-Lorentzian waveforms.
Figure 3C:
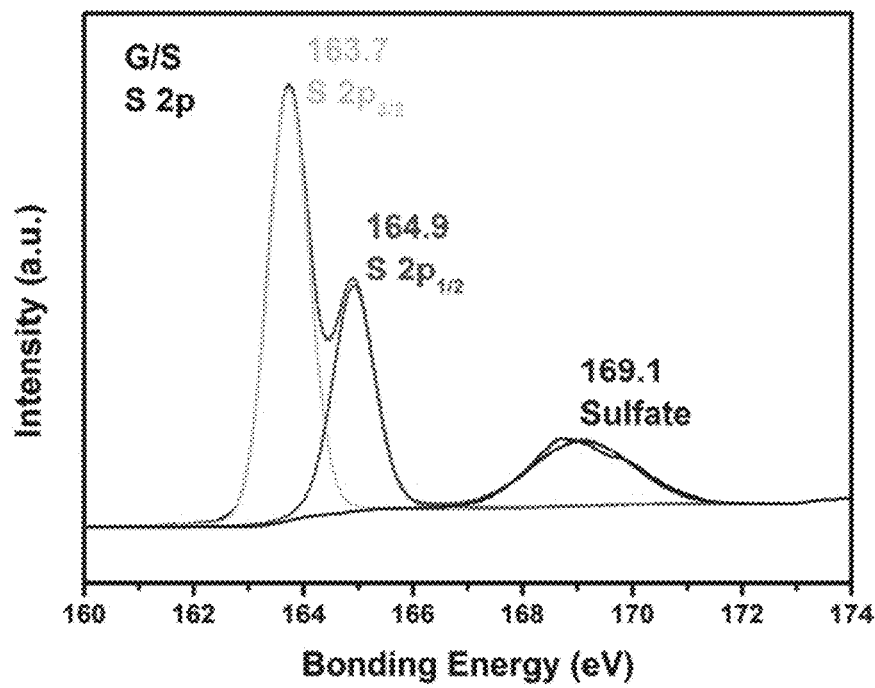
FIG. 3C shows a high-resolution S 2p XPS spectrum of G/S hybrid nanosheet, fitted with Gaussian-Lorentzian waveforms.
Figure 3D:
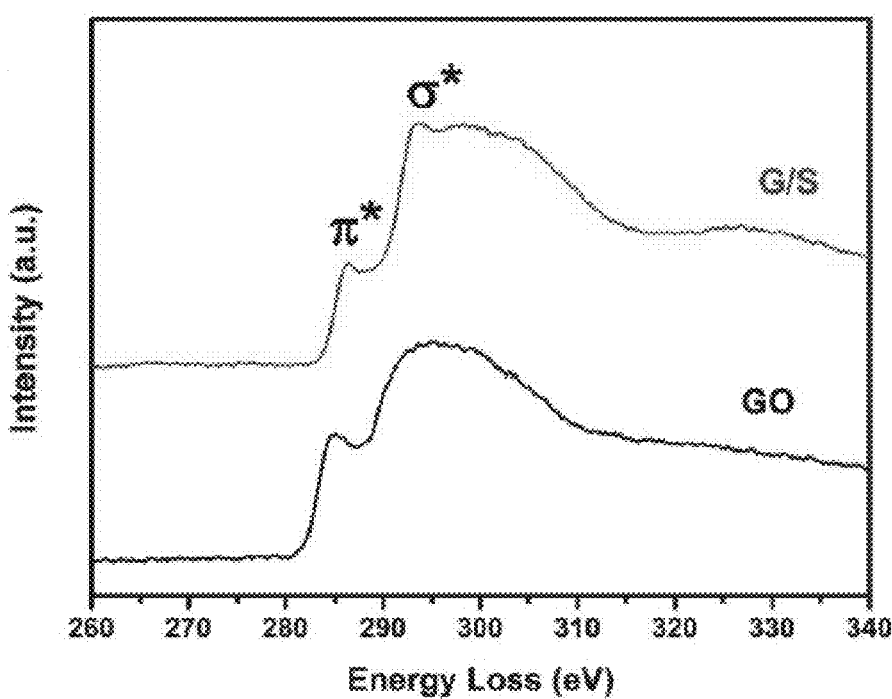
FIG. 3D shows a comparison of core-loss EELS spectra of C K-edge from GO and G/S hybrid nanosheets, which were acquired with the same TEM and similar electro-optical conditions.
Figure 9:
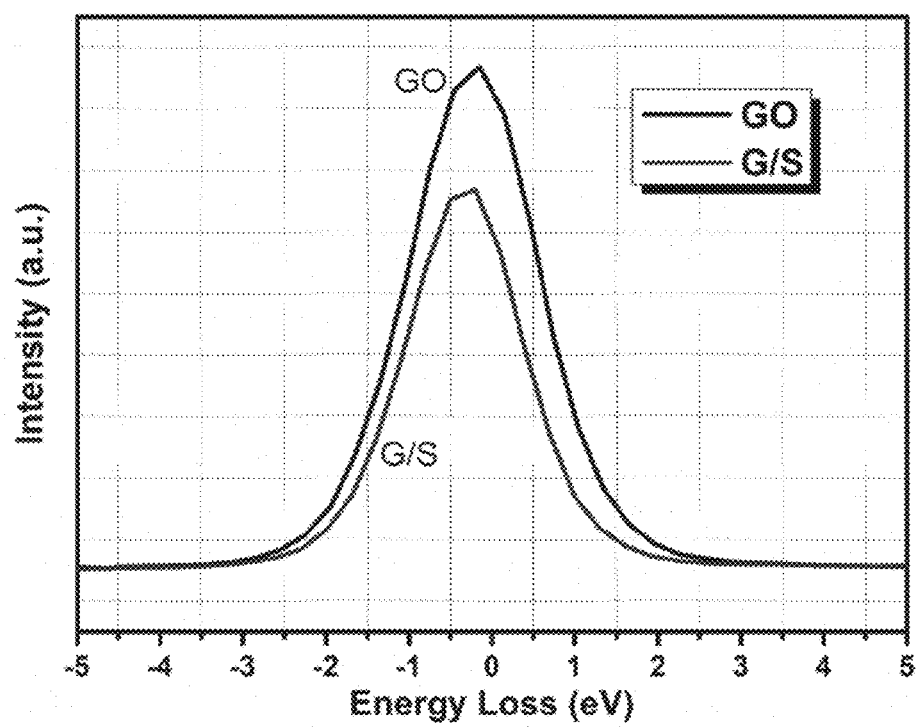
FIG. 9 shows the corresponding EELS zero-loss peaks for the C K-edge spectra in FIG. 2D.

Results: To understand the physicochemical nature of G/S interfaces, the surface characteristics of GO and G/S hybrid nanosheets were then examined by X-ray photoelectron spectroscopy (XPS). The high-resolution C 1s spectrum of GO in FIG. 3A can be fitted to three peaks of C—C/C═C (284.8 eV), C—O (286.9 eV), and C═O (288.0 eV) [44]. In contrast, the C 1s spectrum from G/S nanosheets in FIG. 3B shows an overlap of only two peaks, revealing the removal of C—O/C═O peaks and a significant narrowing of sp$^2$ carbon peak with increased intensity along with the appearance of a new C—S peak (285.6 eV) [45]. The comparison between FIG. 3A and FIG. 3B suggests that the oxygen-containing groups were drastically removed (i.e., GO is reduced to graphene) and converted to C—S bonds (i.e., graphene is sandwiched by sulfur) during the "sauna" reaction, as depicted in FIG. 1. In addition, the S 2p spectrum for the G/S nanosheets in FIG. 3C has a 2p 3/2 and 2p 1/2 spin-orbit levels with an energy separation of 1.2 eV and intensity ratio of 2:1, consistent with previous report from amorphous sulfur. [39] The small shoulder at 169.1 eV can be ascribed to the sulfate species formed upon oxidation of sulfur in air [31, 39]. Further evidence of the interfacial bonding between C and S was found from the EELS study inside TEM. Each C K-edge spectrum consists of a peak at ≈284 eV (originating from the excitations from 1s spin. level to empty n*orbits of the sp$^2$-bonded atoms) and a step at ≈289 eV (due to transition from the 1s level to empty σ* orbits at both sp$^2$ and sp$^3$-bonded atoms). As depicted in FIG. 3D, the fine structure of the C K-edge shows notable changes among GO and G/S nanosheets. First, the sharpening of EELS peaks (both Π* and σ*) from GIS nanosheets compared with that of pristine GO verifies the improvement on crystallization from GO to graphene after "sauna" reaction [42, 46]. Second, as the peak positions of GO match well with those in previous reports, the Π* and σ* peaks of G/S nanosheets present obvious chemical shifts toward high energy, implying higher ionization energy for inner shell electrons of carbon due to the formation of extra C—S bonds. FIG. 9 shows the corresponding EELS zero-loss spectra.

(5) Fourier Transform Infrared (FTIR) Spectroscopy

Procedure: FTIR spectra were taken on a Bruker Vector-22 FTIR spectrometer.

Figure 10:
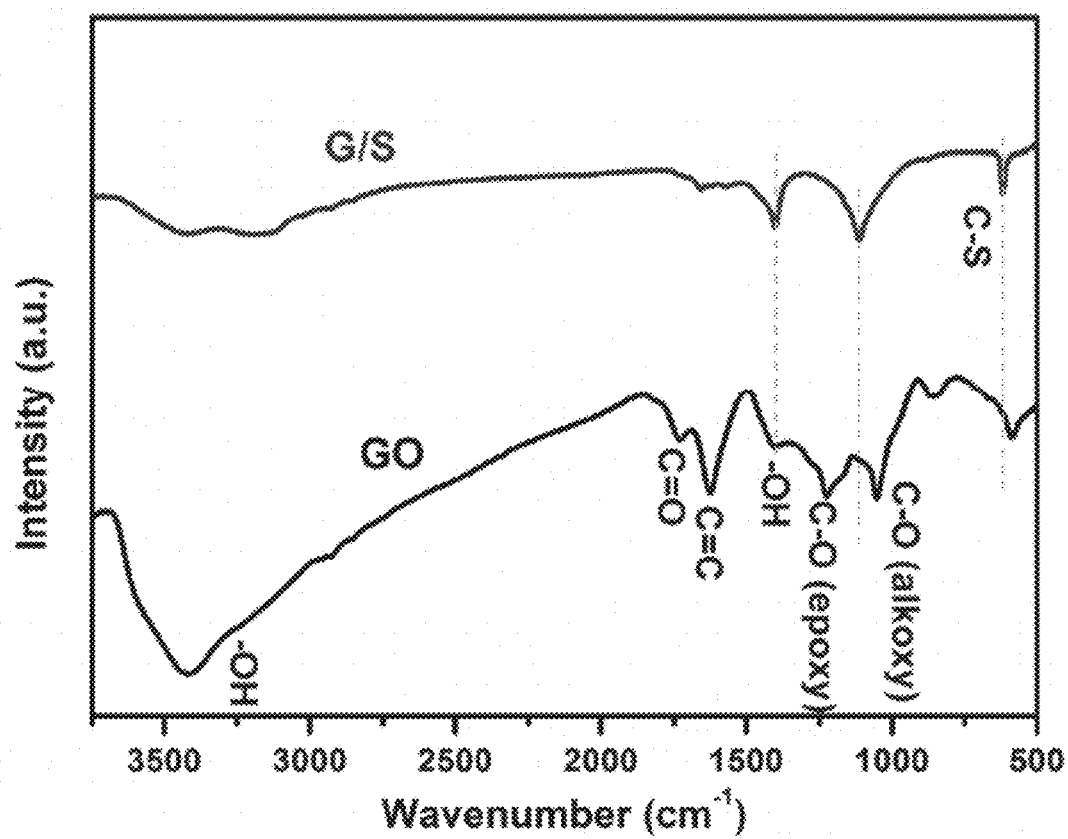
FIG. 10 shows the FTIR spectra for GO and G/S hybrid nanosheets.
Figure 11A:
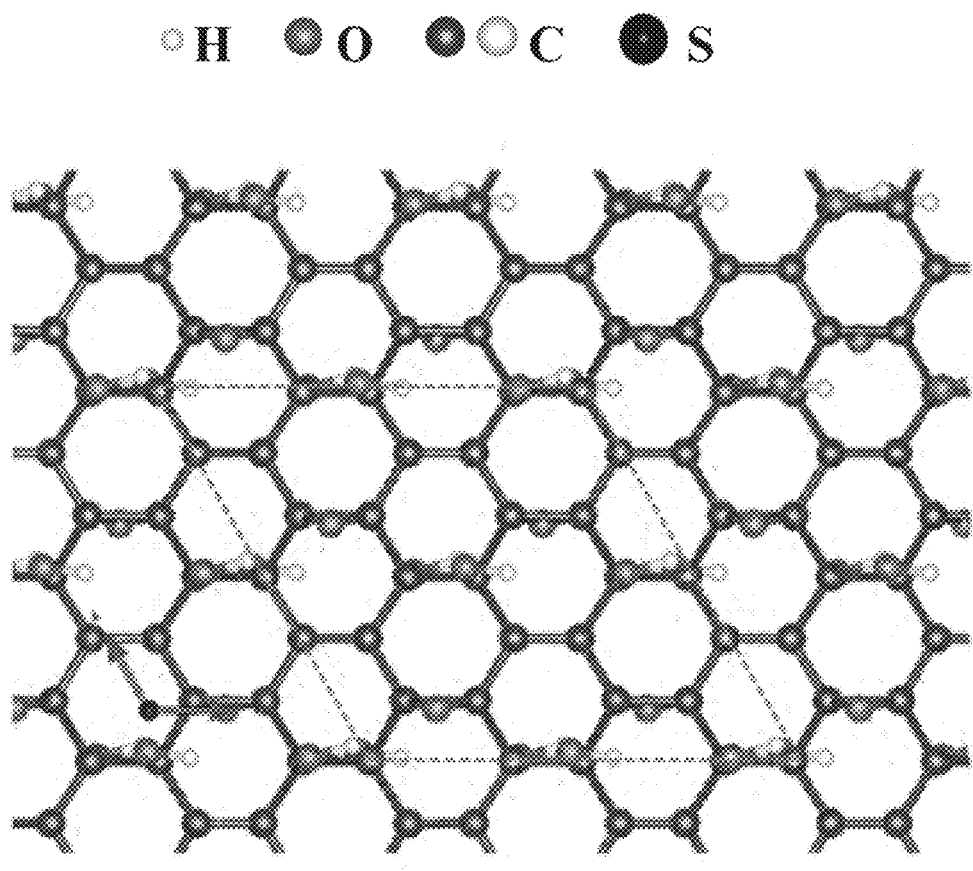
Figure 11B:
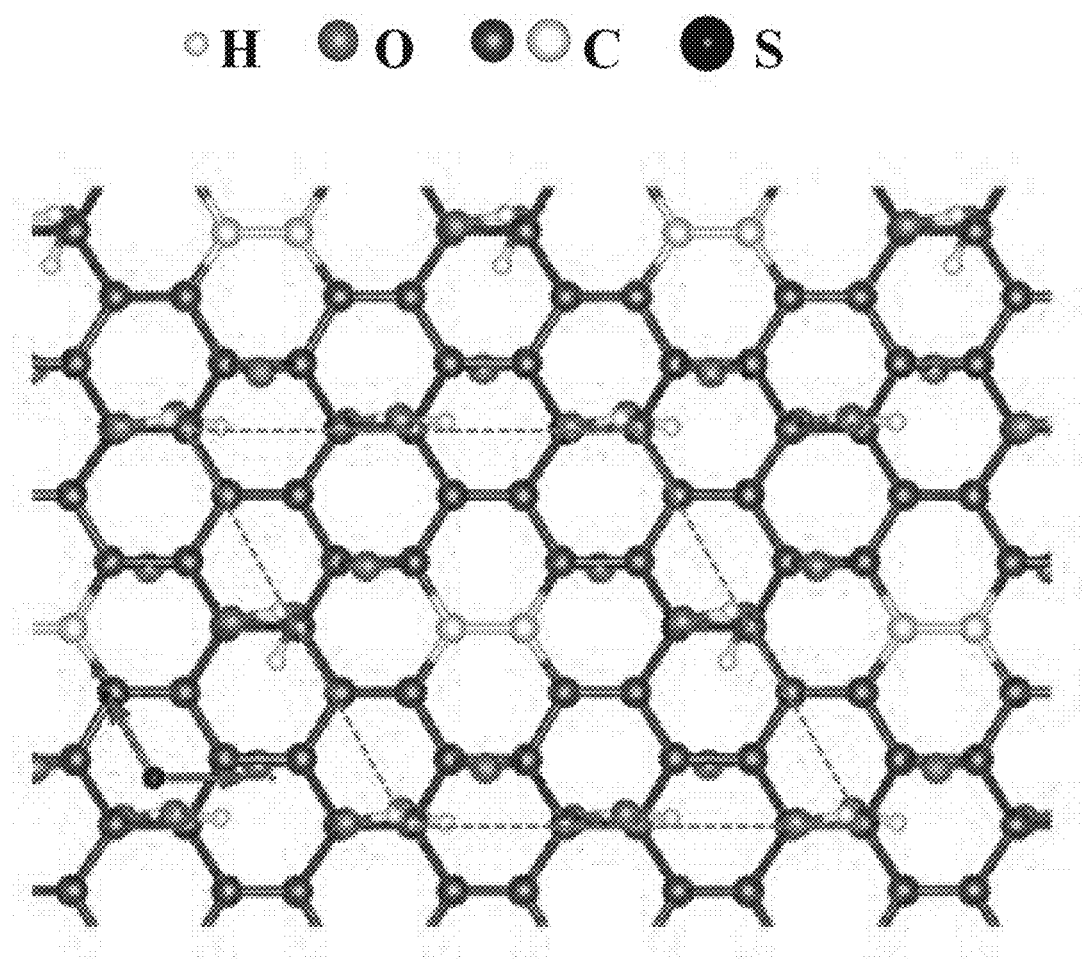
Figure 11C:
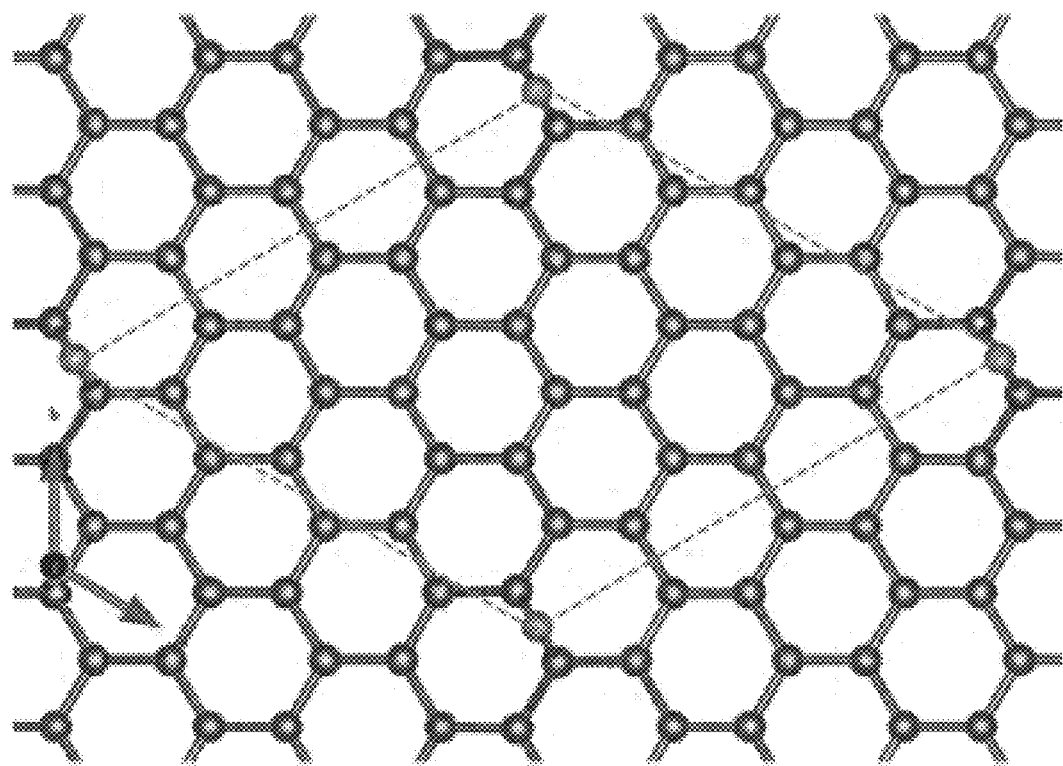
Figure 11D:
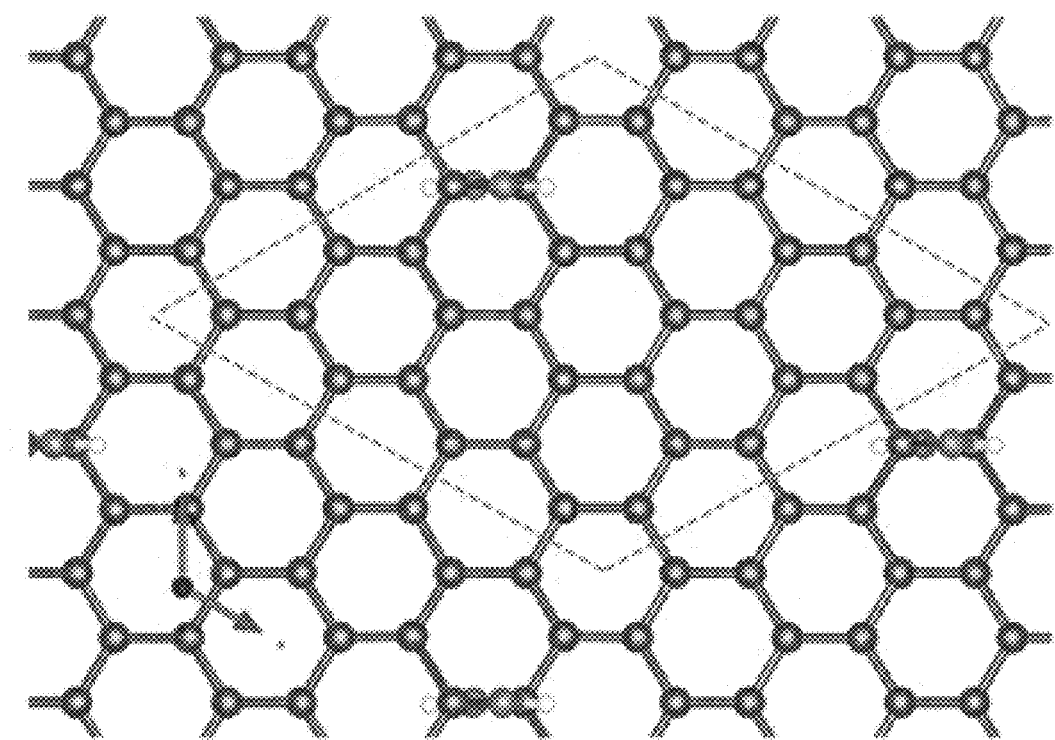
Figure 11E:
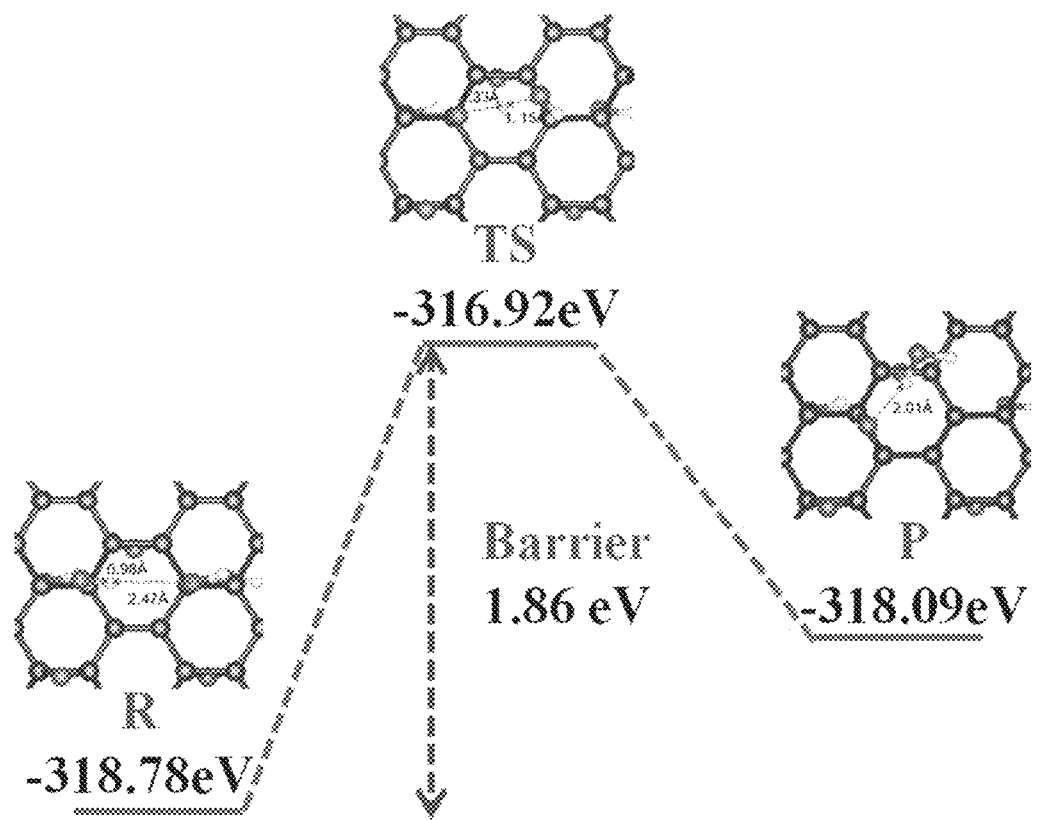
Figure 11G:
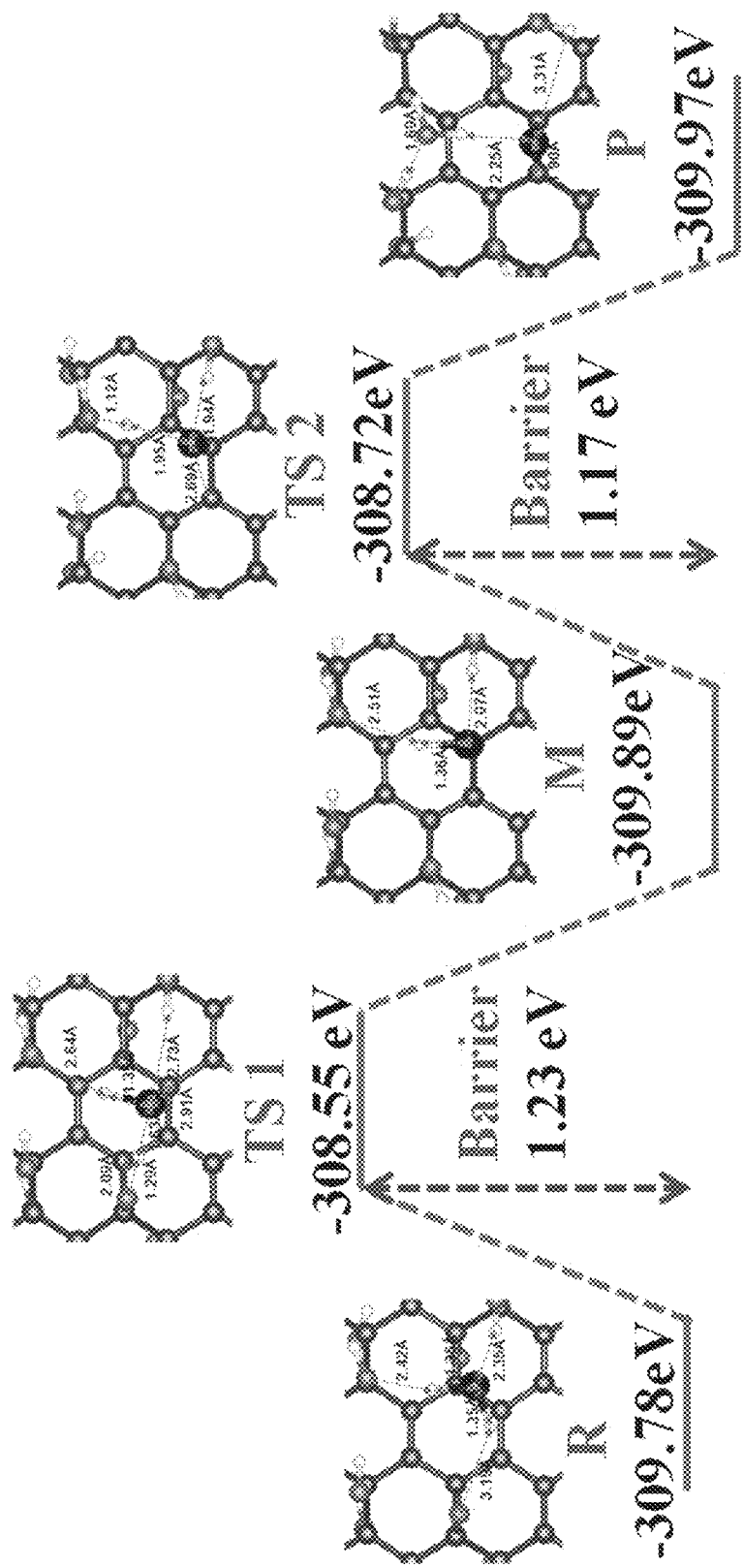
Figure 11H:
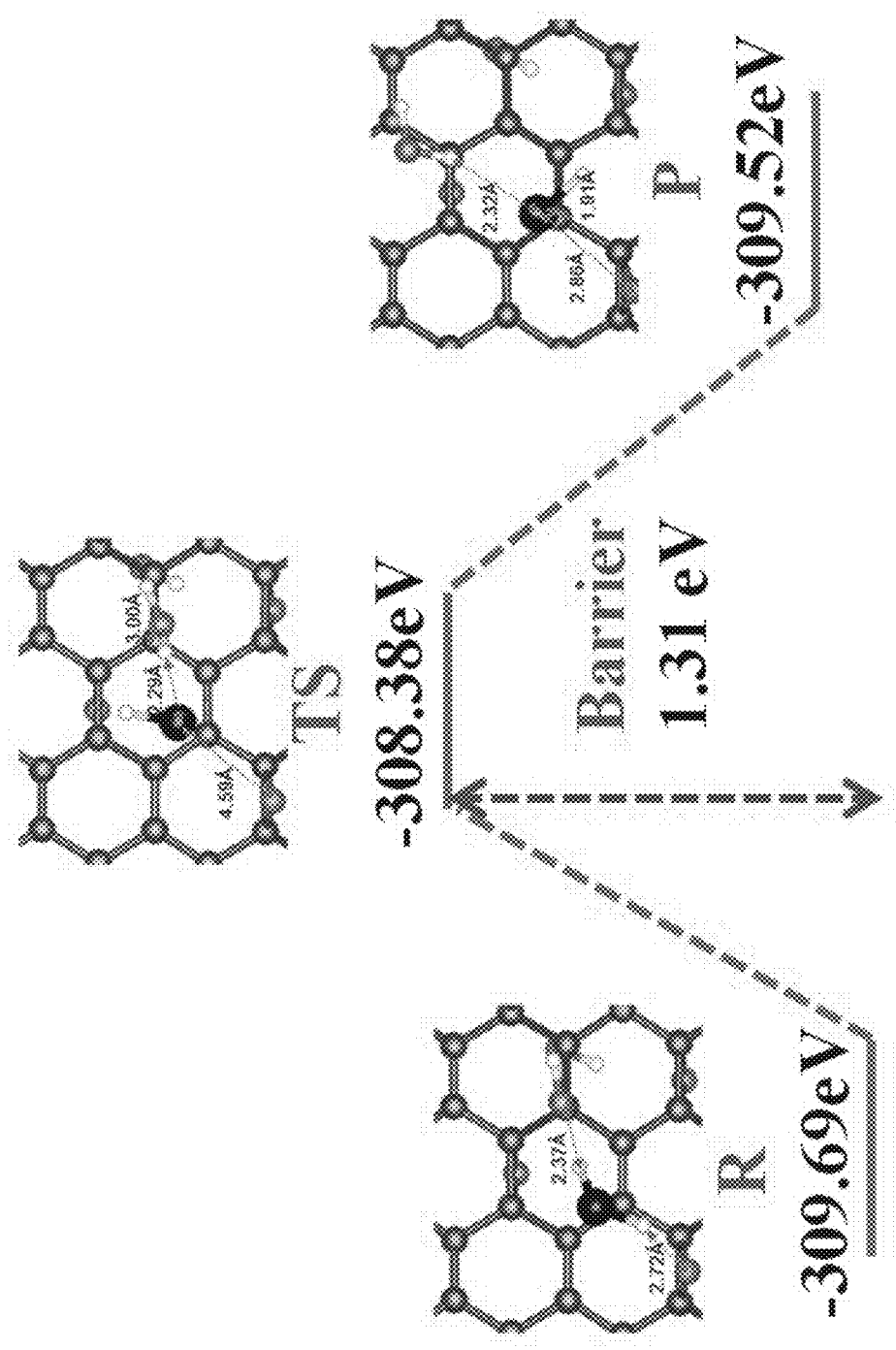

Results: The structural features of G/S nanosheets were also characterized by Fourier transform infrared (FTIR) spectroscopy as shown in FIG. 10. As can be seen, all oxygen-containing groups in GO are greatly reduced or entirely removed for the G/S hybrid nanosheets with the emergence of a new adsorption band at 620 cm$^{-1}$, which can be directly ascribed to the stretch vibrations of C—S bond.

(6) Raman Spectrometry

Procedure: Raman spectra were recorded at room temperature with a JY LABRAM-HR confocal laser micro-Raman spectrometer using Ar$^+$ laser excitation with a wavelength of 514.5 nm.

Figure 3E:
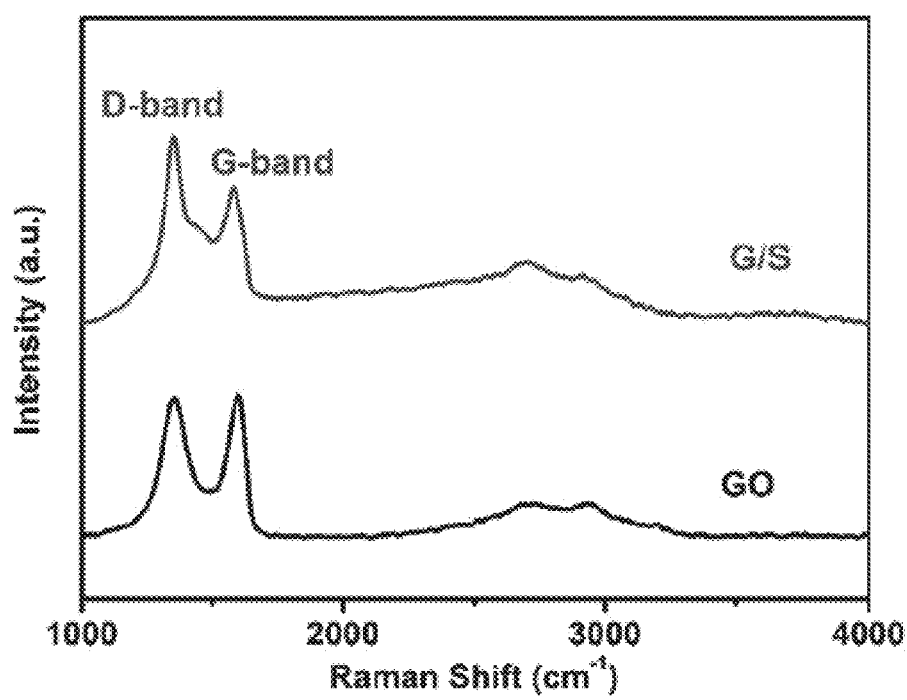
FIG. 3E shows the Raman spectra of GO and G/S hybrid nanosheets.

Results: Raman spectra (FIG. 3E) for GO and G/S nanosheets both exhibit a D band at ≈1580 cm$^{-1}$ (sp$^3$ defects induced disordering) and a G band at ≈1590 cm$^{-1}$ (sp$^2$-bonded pairs), as well as a 2D band at ≈2700 cm$^{-1}$ and a D+G band at ≈2920 cm$^{-1}$ [47]. The $I_D/I_G$ ratio of the G/S nanosheets shows a considerable increase compared with that of GO, suggesting a different structure of graphite basal plane due to the introduction of additional defects by surface sulfur. All the above analyses show that in the G/S hybrid nanosheets, the sulfur contacts with graphene via interfacial chemical bonding (FIG. 1C) that immobilizes sulfur and hence, increase the electrical conductivity of the composite. Such structure would prevent the loss of active material during the charge/discharge process and therefore minimizes the shuttle effect in battery. In short, the graphene of the present invention is unique G/S hybrid architecture which performs its dual functionalities as electronic conductive channel and sulfur reservoir simultaneously.

(7) Electrical Conductivity

Procedure: The electrical conductivity was measured by a standard four-probe technique using the quantum design physical property measurement system (PPMS)-9.

Figure 3F:
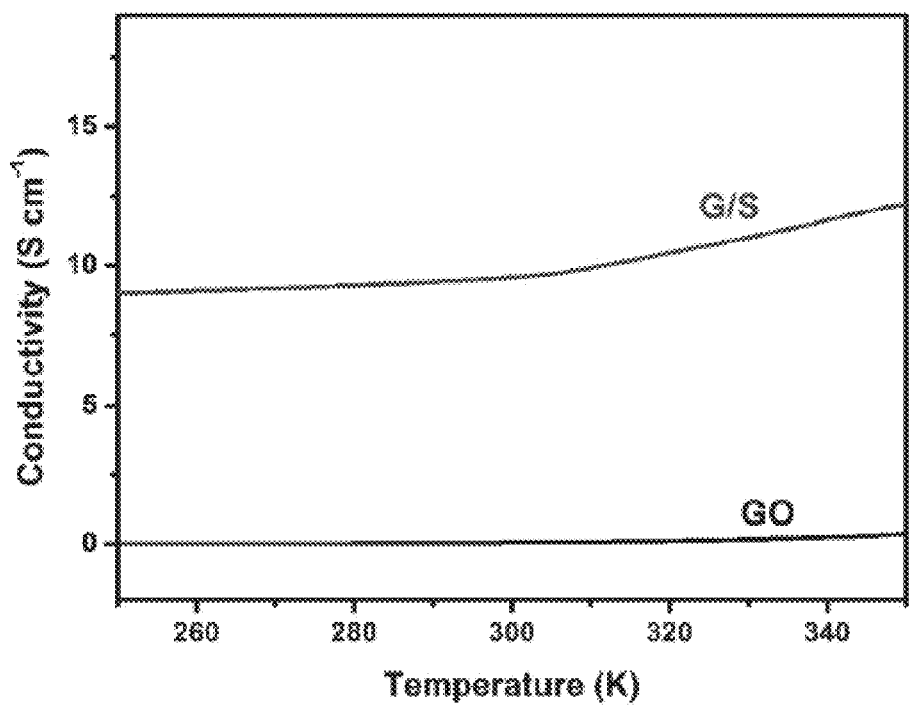
FIG. 3F shows the planar conductivity versus temperature profiles for GO and G/S hybrid nanosheets.

Results: The temperature dependence of planar electrical conductivities for GO and the G/S hybrid nanosheets were measured via a standard four-probe technique and the results are presented in FIG. 3F. As can be seen, GO is almost insulating, while the G/S hybrid nanosheets possess excellent conductivity over a wide temperature range of 250-350 K. At 298 K, the G/S hybrid nanosheets exhibit a conductivity of 9.5 S cm$^{-1}$, which is far better than that of previous reduced graphene oxide/sulfur composite [39, 40], and is also better than that of graphene/sulfur nanocrystals composite [30]. Through careful interfacial engineering, the G/S nanosheets have been endowed with superior electrical conductivity, making outstanding electrochemical performance of sulfur possible.

EXAMPLE 4

Theoretical Calculations

This example illustrates the conditions for theoretical calculation of reaction mechanism between H$_2$S and GO. To further reveal the mechanism of the oxidation-reduction reaction between GO and H$_2$S toward the G/S hybrid nanosheets, the process of Example 2 was simulated.

Procedure: The computation part of this work was carried out by Vienna ab initio simulation package (VASP) [50] code using projected augmented wave (PAW) [51] potentials and generalized gradient approximation (GGA) with Perdew-Burke-Ernzerhof (PBE) [52] exchange-correlation function with cutoff energy set at 400 eV. The convergence criterion of total energy and force of system was set at 10$^{-5}$ eV and 0.01 eV Å$^{-1}$, respectively, with k-points of 5×5×1 for optimization as well as energy. The barriers were carried out with the climbing-image nudged elastic band (CI-NEB) [53] method with force limitation of 0.05 eV Å$^{-1}$. Models used in this calculation are supercell (with 32 carbon atoms; a=b=9.87 Å) of 4×4 graphene unit cell for pure graphene, graphene with single epoxy group —O— and that with two hydroxyls —OH on ortho position, and supercell (with 24 carbon atoms; a=8.63 Å, b=8.71 Å) of 1×2 perfect GO unit cell where all c-axis of cells were set to 20 Å.

The binding energy mentioned above is defined as: for graphene, $E_{b(—OH)}=[E_{(G\ with\ 2-OH)}-E_{(G)}-2E_{(free\ radical-OH)}]/2$; $E_{b(—O—)}=E_{(G\ with\ single\ —O—)}-E_{(G)}-E_{(free\ radical\ —O—)}$; and for GO, $E_{b(—OH)}=[E_{(pGO)}-E_{(G\ without\ 2-OH)}-2E_{(free\ radical\ —OH)}]/2$; $E_{b(—O—)}=E_{(pGO)}-E_{(GO\ without\ single\ —O—)}-E_{(free\ radical\ —O—)}$. The formation energy mentioned above is defined as: for A@Sub+H$_2$S→B@Sub+H$_2$O, $E_{f(A\ by\ B)}=E_{(B@Sub)}+E_{(H_2O\ molecular)}-E_{(A@Sub)}-E_{(H_2S\ molecular)}$; Sub is G or GO, A is —OH or —O—, and B is —SH or —S—. Here, E and G represent total energy and graphene, respectively.

Figure 4A:
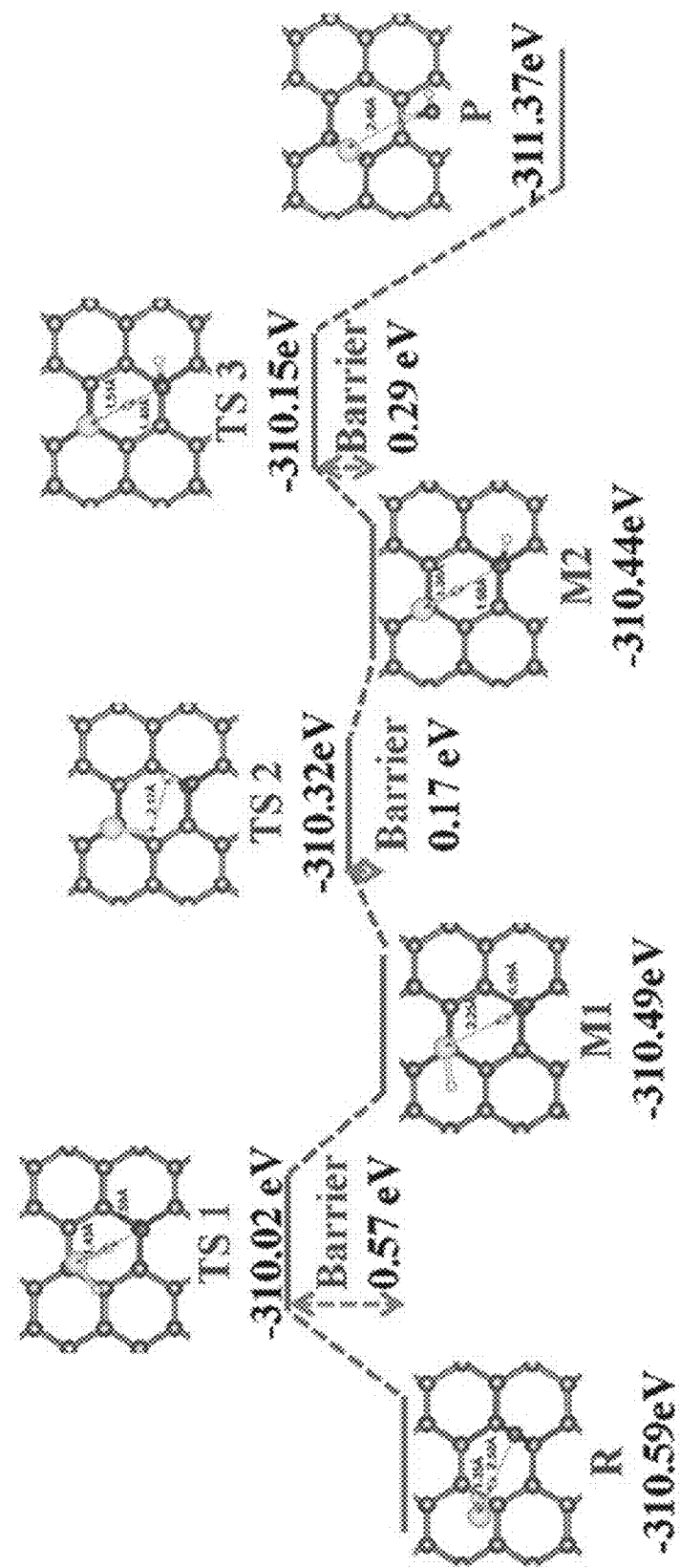
FIG. 4A shows a possible reaction mechanism between GO and $H_2S$ from Example 2, wherein $H_2S$ reacts with single epoxy group O on graphene, including the steps of: i) $H_2S+$—O—→—SH+—OH, ii) —HSLHO—→—SHLOH— (L represents hydrogen bond), iii) —SH+—OH→—S—+$H_2O$. (R=reactant, TS=transition state, M=intermediate product, and P=product)
Figure 4B:
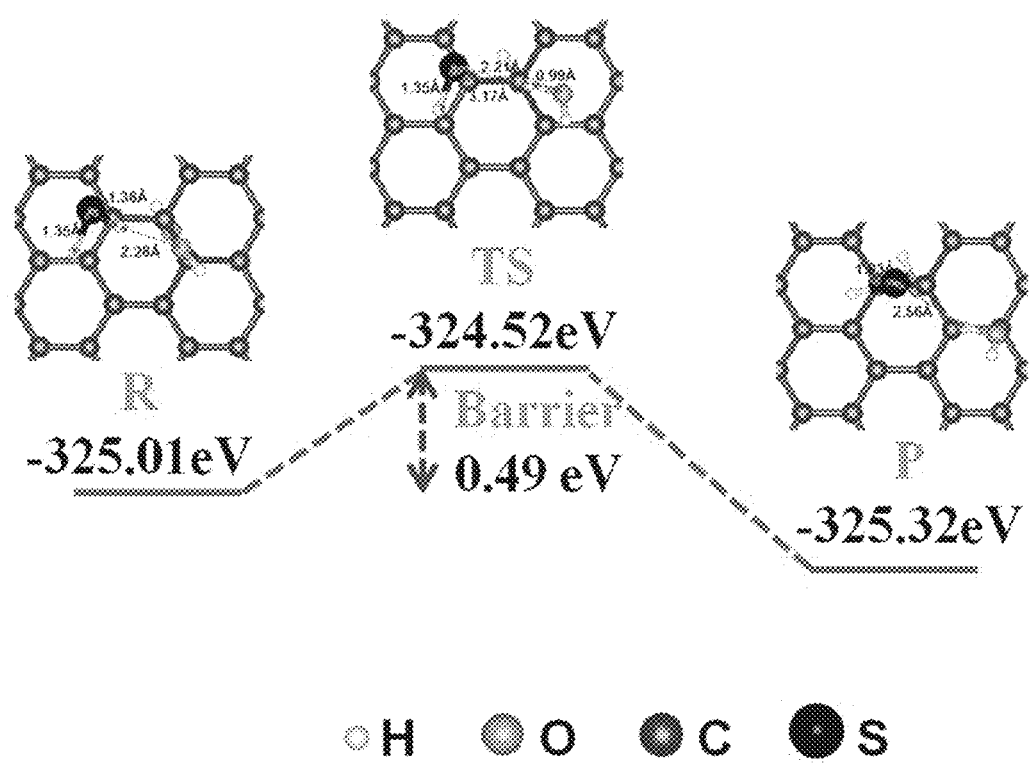
FIG. 4B shows a possible reaction mechanism between GO and $H_2S$ from Example 2, wherein $H_2S$ reacts with two hydroxyls —OH on graphene: $H_2S+$—OH→—SH+$H_2O$. (R=reactant, TS=transition state, and P=product)

Results: Initially, the substitutions of —OH/—O— by —SH/—S— on perfect graphene oxide (pGO) [41] and on graphene were estimated, respectively. The formation energies for substitution of —OH by —SH and —O— by —S— on pGO are −0.09 and −0.54 eV, respectively; while these values of graphene are −0.28 and −0.77 eV, respectively. The results show that the substitution of oxygen atom by sulfur atom on GO is exothermic, and thus the reaction between GO and H$_2$S is spontaneous and quite feasible. Consequently, the dynamic behavior of the reaction was evaluated in detail by calculating the energy barriers (EB) of the reaction pathways. In total, five cases of four substrates were studied, and the details are shown in FIG. 4 and FIG. 11: (1) on pGO, one case of H$_2$S +2OH→HS—OH+H$_2$O with EB of 1.56 eV (FIG. 11F), lower than the self-decomposition of pGO (1.86 eV, FIG. 11E), (2) on GO with defect of two hydroxyls —OH on ortho position, two cases of (2-1): i) H$_2$S+—O—→—SH+—OH with EB of 1.23 eV, ii) —SH+—OH→—S—+H$_2$O with EB of 1.17 eV (FIG. 11G, 2-2) H$_2$S+—OH→—SH+H$_2$O with EB of 1.31 eV (FIG. 11H), (3) on graphene with single epoxy group —O—, i) H$_2$S+—O—→—SH+—OH with EB of 0.57 eV, ii) —HSLHO—→—SHLOH— with EB of 0.17 eV, iii) —SH+—OH→—S—+H$_2$O with EB of 0.29 eV (FIG. 4A), (4) on graphene with two hydroxyls —OH, one case of H$_2$S+—OH→—SH+H$_2$O with EB of 0.49 eV (FIG. 4B). The results suggest that the main energy barrier is at a range of 0.49-1.31 eV in reactions between H$_2$S and —OH/—O— functional groups on GO and graphene, and the value s lower from graphene with a few —O—/—OH (0.49-0.57 eV) than that on GO with high density of —O—/—OH (1.23-1.31 eV). This difference should be attributed to the different binding energies of —OH and —O— on graphene and GO (which are 1.02 and 1.71 eV higher on graphene than those on GO, respectively), as well as the different chemical environments for transition states on graphene and GO (which are almost limitless on graphene but not for GO due to its limited binding site and parochial transforming space). In brief, the oxidation-reduction reaction between GO and H$_2$S is thermodynamically feasible because of the exothermic reaction of sulfur atom to replace oxygen atom on GO. Furthermore, the reaction is likely to take place from the part with lower —OH/—O— density on GO, which is feasible to be realized in mild reaction conditions, i.e., the space-confined "sauna" system of present invention.

EXAMPLE 5

Electrochemical Measurements

To demonstrate the microstructural advantages of G/S hybrid nanosheets and the interfacial engineering for improved battery performance, systematical electrochemical measurements were made with CR2032 coin cell.

Procedure: The working electrodes were prepared by a slurry coating procedure. The slurry consisted of 70 wt % active material, 20 wt % Super P, and 10 wt % poly(vinylidene fluoride) (PVDF) dissolved in N-methyl pyrrolidone (NMP), and was uniformly spread on an aluminum foil current collector. Finally, the electrode was dried at 60° C. overnight.

To evaluate the electrochemical behaviors of these composite electrodes, 2032 coin-type cells using G/S electrode or S electrode as the working electrode, lithium foil as the counter and reference electrode, and Celgard 2400 as the separator were assembled in a glove box filled with Ar gas. The used electrolyte was 1 M $LiCF_3SO_3$ in a mixed solvent of dimethoxyethane and dioxane with a volume ratio of 50:50 containing 0.1 M $LiNO_3$ as an electrolyte additive.

The cycle performance was evaluated on Arbin BT2000-5V5A tester in a voltage range of 1.5-3.0 V (vs $Li^+/Li$) at a constant current density of 0.5 C. The rate capacity was tested at 0.2, 0.5, 1, 2, 5, and 0.2 C, respectively. CV was measured with a scan rate of 0.1 mV $s^{-1}$ in a voltage range of 1.5-3 V by using Solartron 1470E electrochemical workstation for these cells.

Figure 5A:
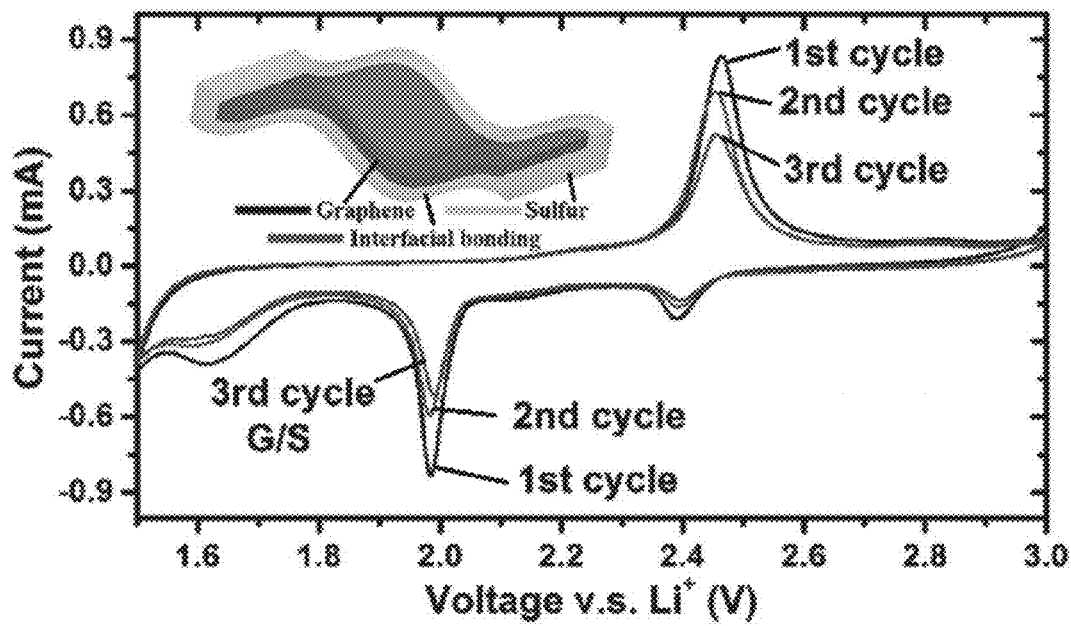
FIGS. 5A-5D show the electrochemical performance of G/S hybrid material as the cathode for lithium-sulfur battery.
Figure 5B:
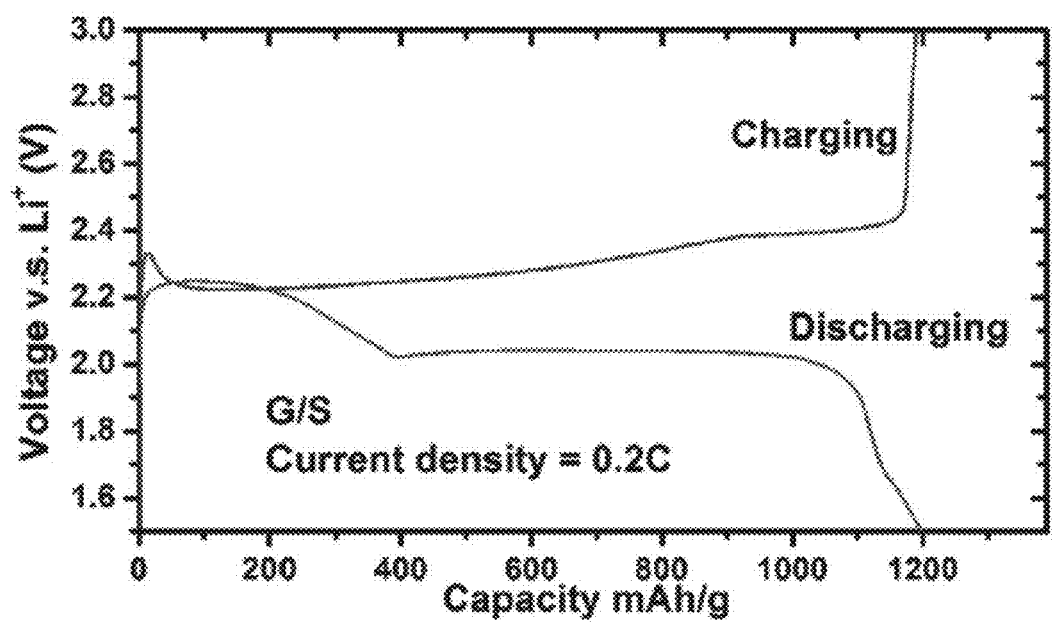
Figure 5C:
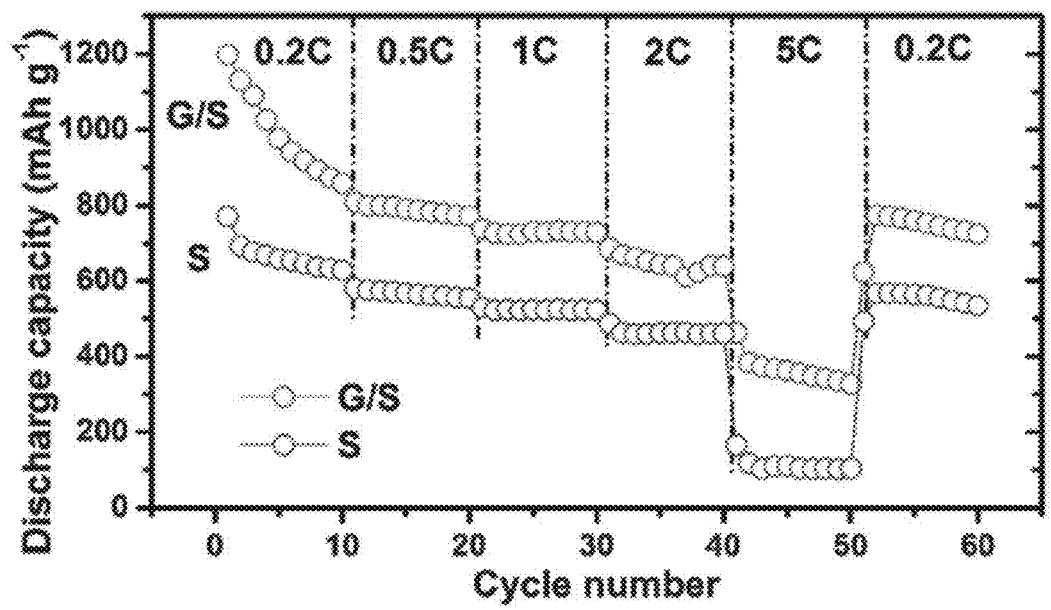
Figure 5D:
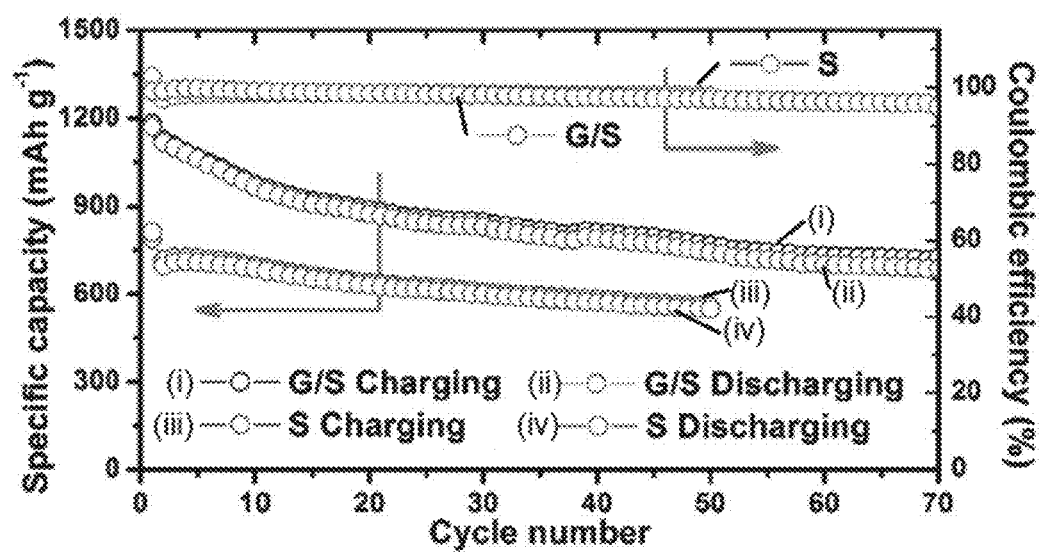
Figure 12:
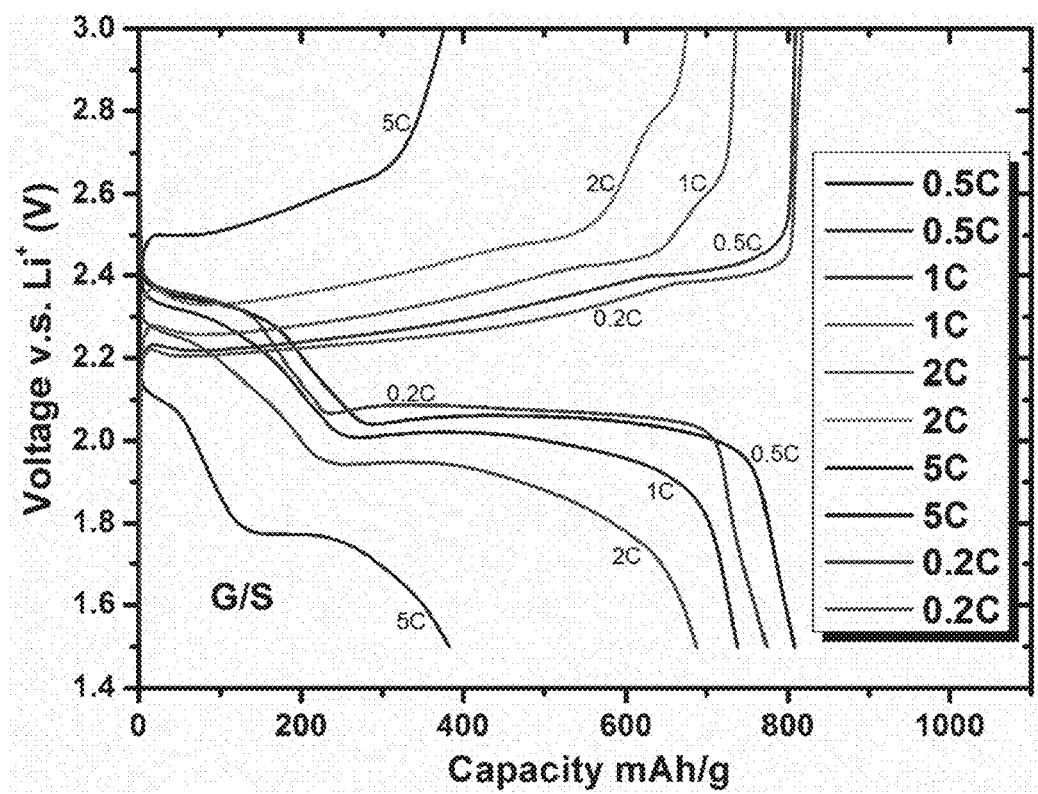
FIG. 12 shows the Discharge/charge voltage profiles of G/S hybrid cathode at various rates from. 0.5 C, 1 C, 2 C, 5 C, and back to 0.2 C, corresponding to FIG. 5C.
Figure 13A:
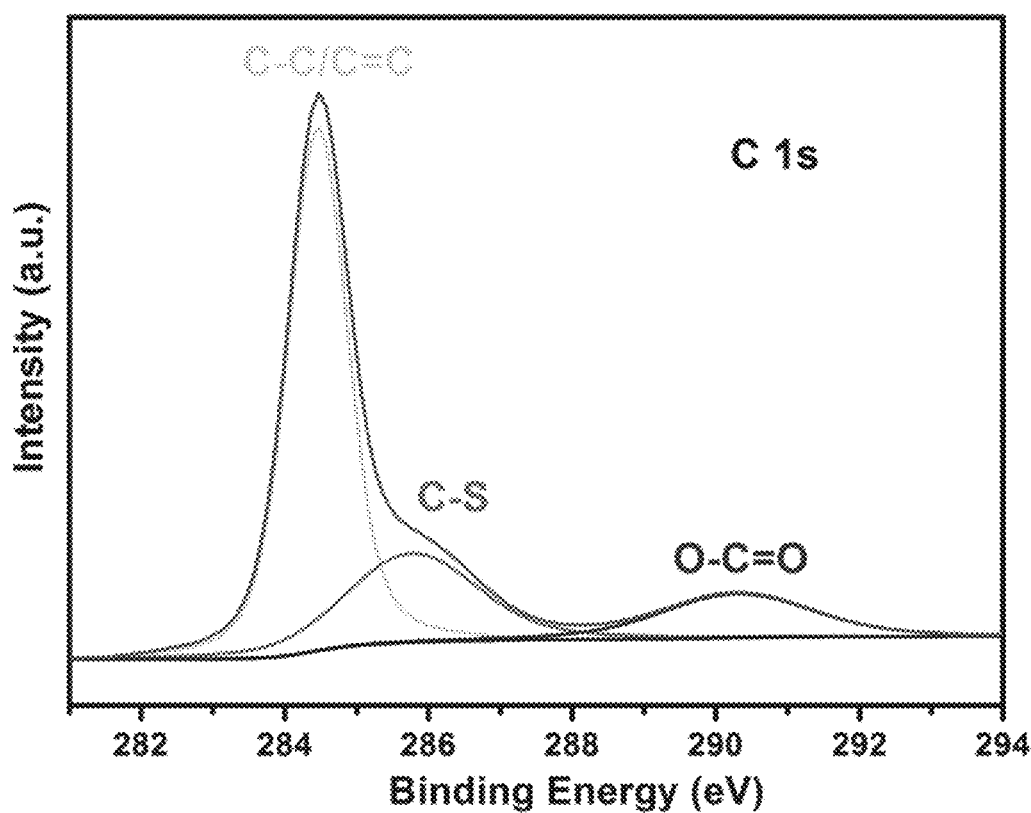
FIG. 13A shows the XPS spectra of the G/S hybrid nanosheets electrode after 70 cycles for C 1s regions.
Figure 13B:
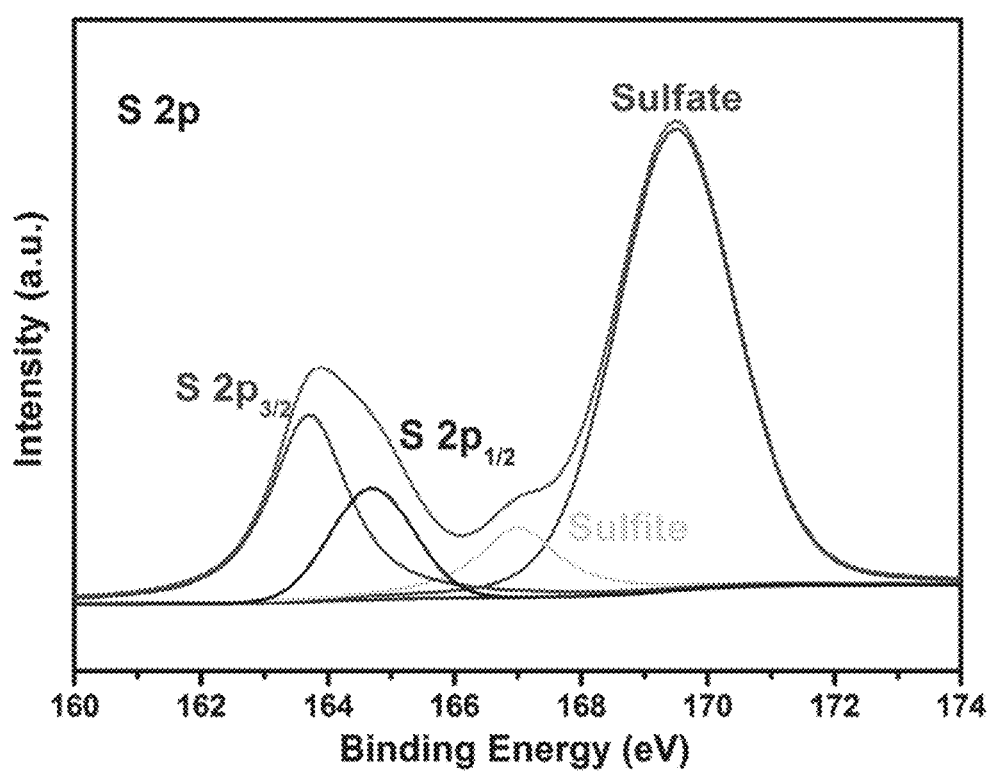
FIG. 13B shows the XPS spectra of the G/S hybrid nanosheets electrode after 70 cycles for S 2p regions.
Figure 14A:
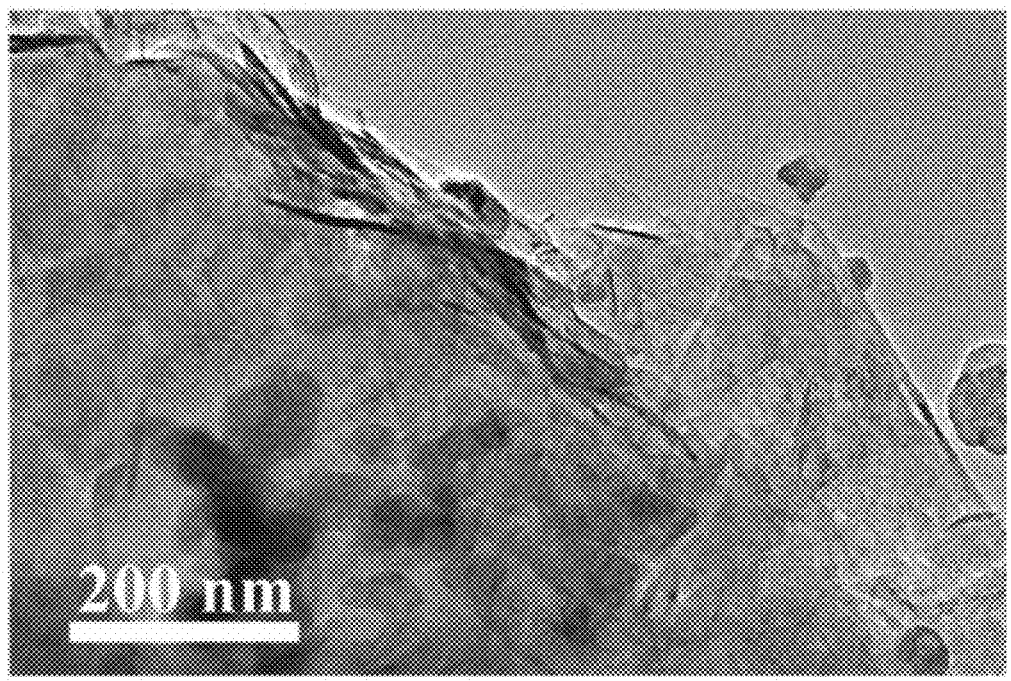
FIGS. 14A-14E show the TEM characterization for G/S hybrid nanosheets after 70 cycles.
Figure 14B:
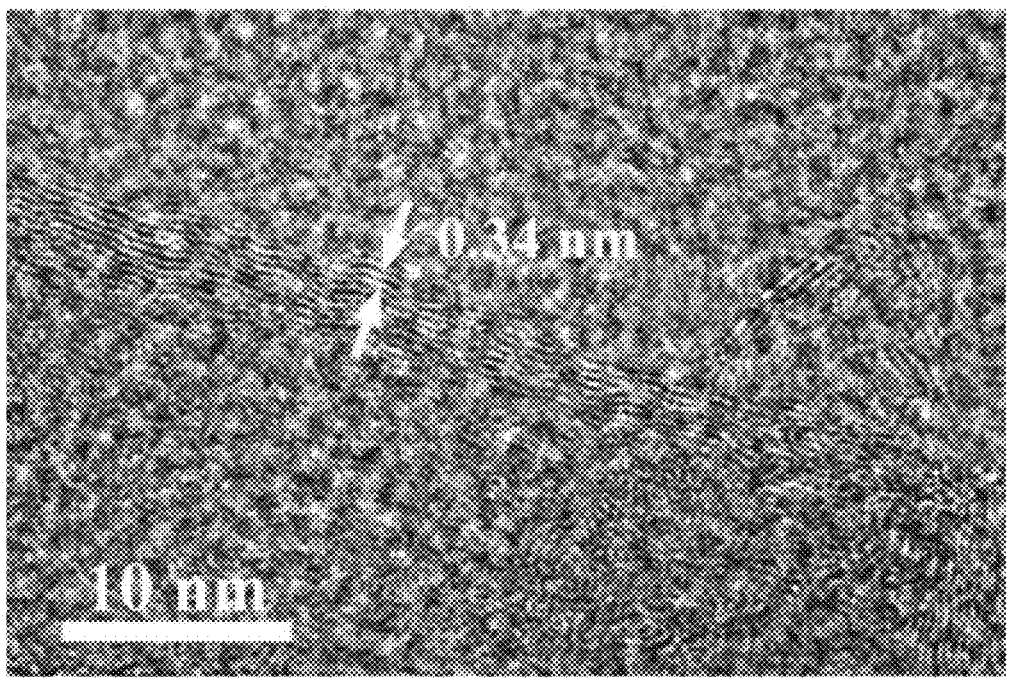
Figure 14C:
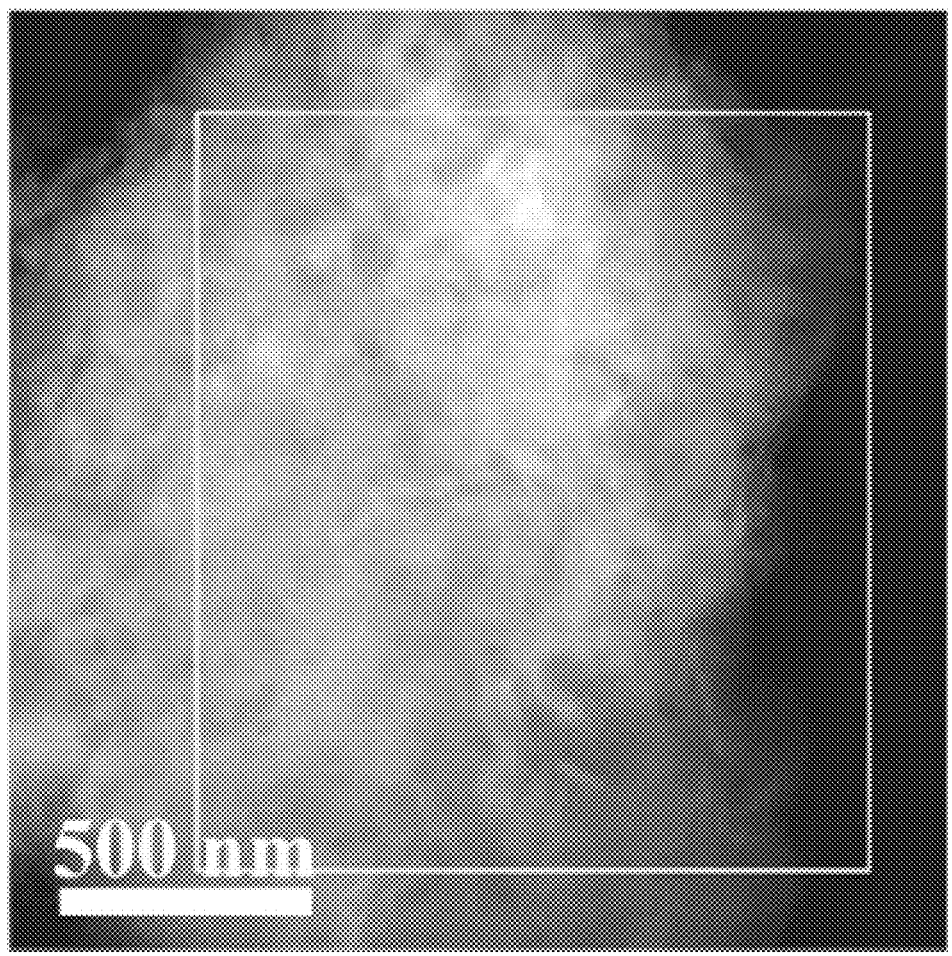
Figure 14D:
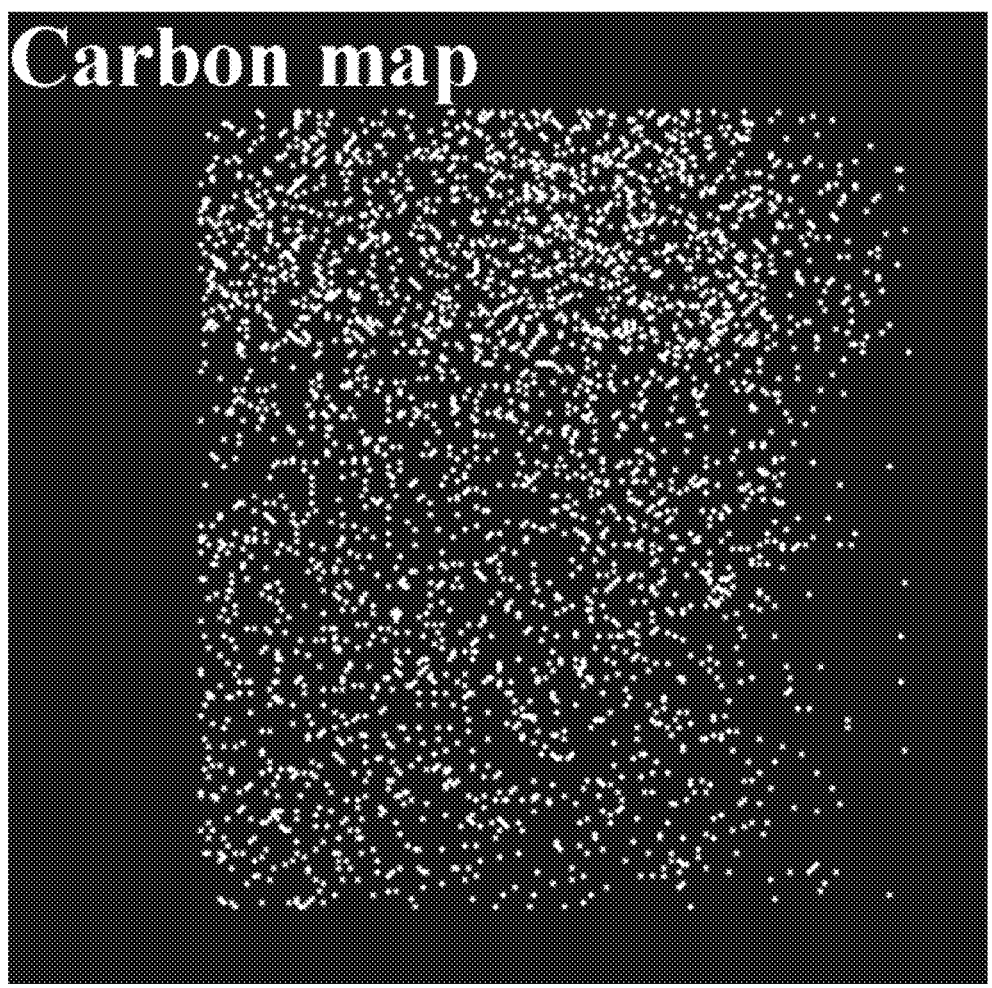
Figure 14E:
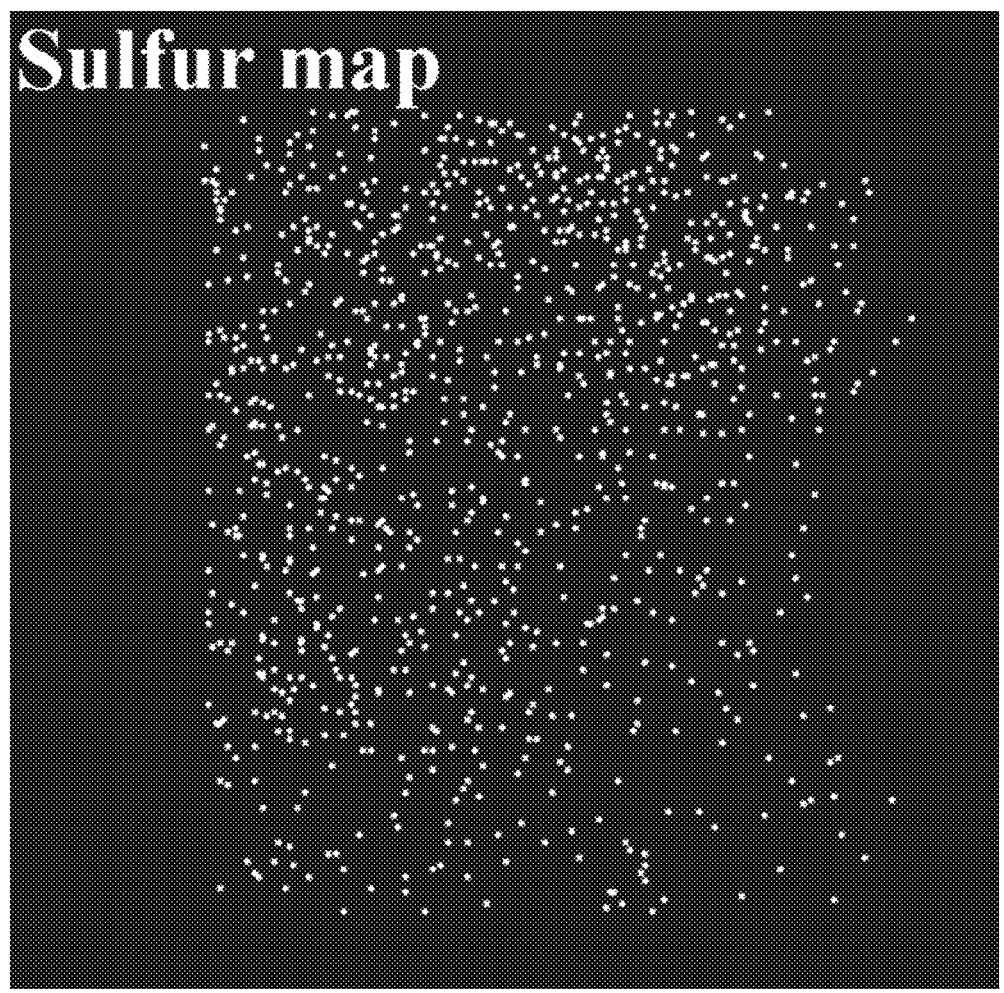

Results: Cyclic voltammetry was first utilized to reveal the electrochemical reaction mechanism of the G/S hybrid nanosheets measured between 1.5 and 3.0 V at a sweep rate of 0.1 mV $s^{-1}$ for the first, second, and third cycles, as shown in FIG. 5A. During the first scan, two cathodic peaks at ≈2.0 and 2.4 V were observed due to the multiple reduction of sulfur in the presence of Li ions. The peak at ≈2.0 V is related to the reduction of sulfur ($S_8$) to higher order polysulfides ($Li_2S_x$, 4<x<8), while the peak at ≈2.4 V is associated with further reduction of these polysulfides to lower-order $Li_2S_2/Li_2S$. In the subsequent anodic scan, the peak at ≈2.45 V is attributed to the conversion of lithium sulfides to polysulfides. These observations are in good agreement with galvanostatic charge-discharge curves (FIG. 5B) and are consistent with previous reports [11, 33]. From the second cycle, both peak positions and areas undergo very little change, implying high electrode stability and hence, good capacity retention. The rate capability of the G/S hybrid cathode was measured at various rates of 0.2, 0.5, 1, 2, and 5 C and then back to 0.2 C (1 C=1675 mA $g^{-1}$) in the potential window of 1.5-3.0 V versus Li+/Li at room temperature (FIG. 5C, a pure sulfur cathode was also prepared for comparison purpose). The results show that the G/S cathode can deliver an initial capacity of 1200 mA h $g^{-1}$ at 0.2 C (see also FIG. 5B), whereas the pure S cathode only achieved 770 mA h $g^{-1}$. The capacity gradually decreased with the increased current rate (see also FIG. 12). For example, a high discharge capacity of ≈700 mA h $g^{-1}$ was obtained at 2 C, meaning a retention rate of ≈60% can still be preserved when the C-rate is increased by tenfold. Moreover, the G/S material recovered most of its original capacity when the C-rate was restored to 0.2 C, indicating that the G/S cathode remains stable even under high rate cycling. The remarkable rate performance of the G/S hybrid nanosheets is directly ascribed to its structural features and interfacial chemistry. The thin nanosheets lead to short Li+ diffusion distance, while the sandwiched structure provides rapid ion transport pathways. The immobilization of sulfur/polysulfides by G/S interfacial bonding is essential in improving the electrochemical performance as it helps to prevent sulfur from dissolving into the electrolyte in long cycling. As evidenced in FIG. 5D, the cycling test of G/S cathode was conducted under the galvanostatic mode at 0.5 C. After 70 cycles, the capacity was greatly preserved and remained as high as 700 mA h $g^{-1}$ at 0.5 C, much better than those of sulfur cathode. It is also worth noting that after the fifth discharge (a quick initial capacity decay has also been observed in various high-capacity sulfur-based composites [20, 48]), the G/S composite achieved a capacity of 1047 mA h $g^{-1}$ and maintained a retention rate of 67% at the end of 70 cycles, corresponding to a small capacity decay of 0.5% $cycle^{-1}$. Furthermore, during the repeated charge/discharge of G/S electrode, the outward migration of dissolved polysulfides and loss of active sulfur were significantly suppressed by the interaction between the sulfur and the graphene surface, as reflected by the constant high Coulombic efficiency (>96%) as well as the systematical postmortem studies [13, 30]. According to FIG. 13, the post-mortem XPS investigation of the G/S electrode after cycling suggests the highly reversible sulfur content in the hybrid nanosheets during the repeated charge-discharge processes (FIG. 13B). Moreover, the effective alleviation of shuttle effect by G/S interfacial bonding is also maintained after such deep cycling, as reflected by the obvious C—S peak in FIG. 13A. Noted the O—C=O peak in FIG. 13A and sulfate/sulfite peaks in FIG. 13B must be caused by the residual electrolyte and its derivants. As shown in FIG. 14, the post-mortem TEM study indicates the existence of large graphene flakes with anchored sulfur (FIG. 14A), which is in consistent with the TEM analysis in FIG. 2. Meanwhile, not only the high crystallinity of graphene was greatly reserved (confirmed by the continuous and straight fringes in FIG. 14B), but also the uniform distribution of sulfur on graphene sheets (FIGS. 14C-14E) was successful maintained after the deep cycling, which is another direct evidence of graphene's alleviation on shuttle effect.

It should be mentioned that the apparently better cycling stability and Coulombic efficiency for sulfur cathode is caused by the continuous supplement of "unreacted" sulfur during cycling, resulted from bad utilization of sulfur at the initial stage (due to the large aggregations and bad conductivity in S cathode). Additionally, the capacity decrease and the cycling instability of lithium-sulfur battery is partially ascribed to the anode material (Li) in current experiment (which forms dendritic and mossy metal deposits during charge/discharge process); therefore, rational engineering toward Li anode (interfacial engineering, surface passivation, or integration of a buffer layer between lithium and electrolyte) is another urgent task to further improve the performance of lithium-sulfur system [49].

REFERENCES

[1] B. Dunn, H. Kamath, J.-M. Tarascon, *Science* 2011, 334, 928.
[2] Y.-X. Yin, S. Xin, Y.-G. Guo, L.-J. Wan, *Angew. Chem., Int. Ed.* 2013, 52, 13186.
[3] R. Van Noorden, *Nature* 2014, 507, 26.
[4] P. G. Bruce, S. A. Freunberger, L. J. Hardwick, J.-M. Tarascon, *Nat. Mater.* 2012, 11, 19.
[5] X. Ji, K. T. Lee, L. F. Nazar, *Nat. Mater.* 2009, 8, 500.
[6] L. Fei, W. Lu, L. Sun, J. Wang, J. Wei, H. L. W. Chan, Y. Wang, *RSC Adv.* 2013, 3, 1297.
[7] L. Fei, L. Sun, W. Lu, M. Guo, H. Huang, J. Wang, H. L. W. Chan, S. Fan, Y. Wang, *Nanoscale* 2014, 6, 12426.
[8] B. Scrosati, J. Hassoun, Y.-K. Sun, *Energy Environ. Sci.* 2011, 4, 3287.
[9] X. Ji, L. F. Nazar, *J. Mater. Chem.* 2010, 20, 9821.
[10] Y. V. Mikhaylik, J. R. Akridge, *J. Electrochem. Soc.* 2004, 151, A1969.

[11] L. Sun, M. Li, Y. Jiang, W. Kong, K. Jiang, J. Wang, S. Fan, *Nano Lett.* 2014, 14, 4044.
[12] Kim, H.-D. Lim, J. Kim, K. Kang, *J. Mater. Chem. A* 2014, 2, 33.
[13] X. Chen, Z. Xiao, X. Ning, Z. Liu, Z. Yang, C. Zou, S. Wang, X. Chen, Y. Chen, S. Huang, *Adv. Energy Mater.* 2014, 4, 1301988.
[14] N. Jayaprakash, J. Shen, S. S. Moganty, A. Corona, L. A. Archer, *Angew. Chem., Int. Ed.* 2011, 50, 5904.
[15] G. Zheng, Y. Yang, J. J. Cha, S. S. Hong, Y. Cui, *Nano Lett.* 2011, 11, 4462.
[16] R. Elazari, G. Salitra, A. Garsuch, A. Panchenko, D. Aurbach, *Adv. Mater.* 2011, 23, 5641.
[17] H. Chen, W. Dong, J. Ge, C. Wang, X. Wu, W. Lu, L. Chen, *Sci. Rep.* 2013, 3, 1910.
[18] W. Zhou, Y. Yu, H. Chen, F. J. DiSalvo, H. D. Abruña, *J. Am. Chem. Soc.* 2013, 135, 16736.
[19] W. Li, G. Zheng, Y. Yang, Z. W. Seh, N. Liu, Y. Cui, *Proc. Natl. Acad. Sci. USA* 2013, 110, 7148.
[20] G.-C. Li, G.-R. Li, S.-H. Ye, X.-P. Gao, *Adv. Energy Mater.* 2012, 2, 1238.
[21] G. Zheng, Q. Zhang, J. J. Cha, Y. Yang, W. Li, Z. W. Seh, Y. Cui, *Nano Lett.* 2013, 13, 1265.
[22] W. Li, Q. Zhang, G. Zheng, Z. W. Seh, H. Yao, Y. Cui, *Nano Lett.* 2013, 13, 5534.
[23] Z. W. Seh, W. Li, J. J. Cha, G. Zheng, Y. Yang, M. T. McDowell, P.-C. Hsu, Y. Cui, *Nat. Commun.* 2013, 4, 1331.
[24] H. Wang, Y. Yang, Y. Liang, J. T. Robinson, Y. Li, A. Jackson, Y. Cui, H. Dai, *Nano Lett.* 2011, 11, 2644.
[25] S. Evers, L. F. Nazar, *Chem. Commun.* 2012, 48, 1233.
[26] R. Chen, T. Zhao, J. Lu, F. Wu, L. Li, J. Chen, G. Tan, Y. Ye, K. Amine, *Nano Lett.* 2013, 13, 4642.
[27] J.-Q. Huang, X.-F. Liu, Q. Zhang, C.-M. Chen, M.-Q. Zhao, S.-M. Zhang, W. Zhu, W.-Z. Qian, F. Wei, *Nano Energy* 2013, 2, 314.
[28] T. Lin, Y. Tang, Y. Wang, H. Bi, Z. Liu, F. Huang, X. Xie, M. Jiang, *Energy Environ. Sci.* 2013, 6, 1283.
[29] S. Lu, Y. Cheng, X. Wu, J. Liu, *Nano Lett.* 2013, 13, 2485.
[30] G. Zhou, L.-C. Yin, D.-W. Wang, L. Li, S. Pei, I. R. Gentle, F. Li, H.-M. Cheng, *ACS Nano* 2013, 7, 5367.
[31] C. Zu, A. Manthiram, *Adv. Energy Mater.* 2013, 3, 1008.
[32] S. Lu, Y. Chen, X. Wu, Z. Wang, Y. Li, *Sci. Rep.* 2014, 4, 4629.
[33] X. Yang, L. Zhang, F. Zhang, Y. Huang, Y. Chen, *ACS Nano* 2014, 8, 5208.
[34] H. Zhao, Z. Peng, W. Wang, X. Chen, J. Fang, J. Xu, *J. Power Sources* 2014, 245, 529.
[35] M.-Q. Zhao, Q. Zhang, J.-Q. Huang, G.-L. Tian, J.-Q. Nie, H.-J. Peng, F. Wei, *Nat. Commun.* 2014, 5, 3410.
[36] Z. Wang, Y. Dong, H. Li, Z. Zhao, H. Bin Wu, C. Hao, S. Liu, J. Qiu, X. W. D. Lou, *Nat. Commun.* 2014, 5, 5002.
[37] Z. Liang, G. Zheng, W. Li, Z. W. Seh, H. Yao, K. Yan, D. Kong, Y. Cui, *ACS Nano* 2014, 8, 5249.
[38] X. Liang, A. Garsuch, L. F. Nazar, *Angew. Chem., Int. Ed.* 2015, 54, 3907.
[39] L. Zhang, L. Ji, P.-A. Glans, Y. Zhang, J. Zhu, J. Guo, *Phys. Chem. Chem. Phys.* 2012, 14, 13670.
[40] L. Ji, M. Rao, H. Zheng, L. Zhang, Y. Li, W. Duan, J. Guo, E. J. Cairns, Y. Zhang, *J. Am. Chem. Soc.* 2011, 133, 18522.
[41] L. Wang, K. Lee, Y. Y. Sun, M. Lucking, Z. Chen, J. J. Zhao, S. B. Zhang, *ACS Nano* 2009, 3, 2995.
[42] K. A. Mkhoyan, A. W. Contryman, J. Silcox, D. A. Stewart, G. Eda, C. Mattevi, S. Miller, M. Chhowalla, *Nano Lett.* 2009, 9, 1058.
[43] D. C. Marcano, D. V Kosynkin, J. M. Berlin, A. Sinitskii, Z. Sun, A. Slesarev, L. B. Alemany, W. Lu, J. M. Tour, *ACS Nano* 2010, 4, 4806.
[44] S. Stankovich, D. A. Dikin, R. D. Piner, K. A. Kohlhaas, A. Kleinhammes, Y. Jia, Y. Wu, S. T. Nguyen, R. S. Ruoff, *Carbon* 2007, 45, 1558.
[45] K. H. Lee, P. E. Schwenn, A. R. G. Smith, H. Cavaye, P. E. Shaw, M. James, K. B. Krueger, I. R. Gentle, P. Meredith, P. L. Burn, *Adv. Mater.* 2011, 23, 766.
[46] Z. Xu, Y. Bando, L. Liu, W. Wang, X. Bai, D. Golberg, *ACS Nano* 2011, 5, 4401.
[47] A. Ferrari, J. Robertson, *Phys. Rev. B* 2000, 61, 14095.
[48] X. Ji, S. Evers, R. Black, L. F. Nazar, *Nat. Commun.* 2011, 2, 325.
[49] R. Cao, W. Xu, D. Lv, J. Xiao, J.-G. Zhang, *Adv. Energy Mater.* 2015, DOI: 10.1002/aenm.201402273.
[50] P. E. Blöchl, *Phys. Rev. B* 1994, 50, 17953.
[51] J. P. Perdew, Y. Wang, *Phys. Rev. B* 1992, 45, 13244.
[52] J. P. Perdew, K. Burke, M. Ernzerhof, *Phys. Rev. Lett.* 1996, 77, 3865.
[53] G. Henkelman, B. P. Uberuaga, H. Jónsson, *J. Chem. Phys.* 2000, 113, 9901.

What is claimed is:

1. A method for synthesizing graphene/sulfur composite, comprising the steps of,
   (a) mixing graphene oxide (GO) with a hydrogen sulfide ($H_2S$)-releasing agent as powders in a sealed vessel containing water in a tube;
   (b) causing water vapor to form from said water, said vapor hydrolyzing said $H_2S$-releasing agent to release hydrogen sulfide; and
   (c) allowing the hydrogen sulfide to react with the graphene oxide at an elevated temperature to form said graphene/sulfur composite.

2. The method of claim 1, wherein the graphene oxide is prepared from graphite flake using a chemical oxidation method selected from the Hummers method, Staudenmeier method, Hofmann method, and Brodie method.

3. The method of claim 1, wherein the $H_2S$-releasing agent is selected from thioacetamide, thiourea, dimethylthiourea, thiosulfate, and any combination thereof.

4. The method of claim 1, wherein the weight ratio of GO to $H_2S$-releasing agent is in a range of 1:1-1:100.

5. The method of claim 1, wherein the method is carried out under an atmosphere of inert gas selected from nitrogen, helium, argon, neon, xenon, krypton, and radon.

6. The method of claim 1, wherein the elevated temperature is 60-300° C.

7. The method of claim 1, wherein step (c) is performed over a period of 5-30 h.

8. A graphene/sulfur composite prepared by the method of claim 1, wherein the sulfur is homogeneously distributed on graphene with a strong chemical bonding interface.

9. The graphene/sulfur composite of claim 8, wherein the sulfur loading of the composite ranges from 5% to 80%.

10. The graphene/sulfur composite of claim 8, wherein the graphene-sulfur composite has a sandwiched structure of sulfur/graphene/sulfur.

11. The graphene/sulfur composite of claim 8, where the graphene/sulfur composite has an ultrahigh electronic conductivity of at least 9.5 S/cm.

12. The graphene/sulfur composite of claim 8, wherein the graphene/sulfur composite can be directly used as a cathode material in a rechargeable lithium-sulfur battery.

13. The graphene/sulfur composite of claim 8, wherein the diffusion of sulfur and/or polysulfides into electrolyte during charge/discharge cycles is significantly suppressed due to the strong chemical bonding between sulfur and graphene.

14. The graphene/sulfur composite of claim 8, wherein a cathode made from said graphene/sulfur composite has an initial charging capacity of at least 1200 mAh/g at 0.2 C.

15. The graphene/sulfur composite of claim 8, wherein a cathode made from said graphene/sulfur composite has a high discharging capacity of at least 700 mAh/g at 2 C.

16. The graphene/sulfur composite of claim 8, wherein a cathode made from said graphene/sulfur composite has a retention rate of at least 67% after 70 cycles.

* * * * *